(12) United States Patent
Sakai et al.

(10) Patent No.: US 8,775,484 B2
(45) Date of Patent: Jul. 8, 2014

(54) DATA MANAGEMENT APPARATUS AND METHOD

(75) Inventors: Kazuyuki Sakai, Kawasaki (JP); Yasushi Kobayashi, Kawasaki (JP); Yuuki Tada, Kawasaki (JP); Tomoyuki Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 191 days.

(21) Appl. No.: 12/894,725

(22) Filed: Sep. 30, 2010

(65) Prior Publication Data

US 2011/0246541 A1    Oct. 6, 2011

(30) Foreign Application Priority Data

Sep. 30, 2009 (JP) ................................. 2009-228840

(51) Int. Cl.
*G06F 17/30* (2006.01)

(52) U.S. Cl.
USPC .................................. 707/812; 707/E17.005

(58) Field of Classification Search
None
See application file for complete search history.

(56) References Cited

U.S. PATENT DOCUMENTS

| | | | |
|---|---|---|---|
| 8,024,409 B2* | 9/2011 | Wilson | 709/206 |
| 2005/0256735 A1* | 11/2005 | Bayne | 705/1 |
| 2008/0012759 A1* | 1/2008 | Te-Yi | 342/357.06 |
| 2008/0168135 A1* | 7/2008 | Redlich et al. | 709/204 |
| 2008/0256099 A1* | 10/2008 | Chodorov et al. | 707/100 |

FOREIGN PATENT DOCUMENTS

| | | |
|---|---|---|
| JP | 05-95357 | 4/1993 |
| JP | 2001-166969 A | 6/2001 |
| JP | 2003-18165 | 1/2003 |

OTHER PUBLICATIONS

Japanese Office Action mailed Nov. 26, 2013 for corresponding Japanese Application No. 2009-228840, with Partial English-language Translation.
Tsunoda, Hiroshi et al., "Efficient Log Transfer based on Priority Queuing and Message Aggregation for Logging over Wireless Networks," IEICE Technical Report, Japan, The Institute of Electronics, Information and Communication Engineers, Sep. 3, 2009, vol. 109, No. 190, pp. 19-24, with English-language Abstract.
Japanese Office Action mailed Sep. 3, 2013 for corresponding Japanese Application No. 2009-228840, with Partial English-language Translation.

* cited by examiner

*Primary Examiner* — Anteneh Girma
(74) *Attorney, Agent, or Firm* — Fujitsu Patent Center

(57) ABSTRACT

The present invention, an apparatus includes a data management apparatus comprising, a determination unit configured to determine whether an analyzing apparatus is in a communicable state when a configuration information data indicating a status of a server apparatus is received from a data collection apparatus, the data analyzing apparatus analyzing the configuration information data, an unprocessed information storage unit configured to store the received configuration information data once it is determined that data analyzing apparatus is in an incommunicable state, an integrating unit configured to integrate a plurality of configuration information data stored in the storage unit in accordance with a predetermined condition; and a notifying unit configured to send, to the analyzing apparatus, a message indicating that the data management apparatus is storing the configuration information data integrated by the integrating unit once it is determined that the data analyzing apparatus is in a communicable state.

7 Claims, 24 Drawing Sheets

FIG. 3

| CI-ID | APPLICATION NAME | CONFIGURATION INFORMATION | UPDATE DATE |
|---|---|---|---|
| 7000 | Web1 | ID、Status… | 2009/8/7 |
| 7002 | Web2 | ID、Status… | 2009/6/6 |
| 7025 | Appl1 | ID、Status… | 2009/7/20 |
| 7155 | Appl2 | ID、Status… | 2009/8/20 |
| 79010 | DB1 | ID、Status… | 2009/12/30 |
| … | … | … | … |

FIG. 4

```
Instance
id=INS_m1_10000
name=Appl1
status=active
        ComposingProcess
        id=PROC_m1_1000
        pid=1000
        status=active
        ComposingProcess
        id=PROC_m1_1001
        pid=1001
        status=active
        DiscoveredElement
        id=DE_m1_10000
        name=webapp1
        status=active
        type=webmodule
        :
        DiscoveredElement
        id=DE_m1_10001
        name=webapp2
        status=active
        type=webmodule
        :
```

FIG. 6

| ID | CI-ID | CI-ID | PARENT OBJECT |
|---|---|---|---|
| 8000 | 7000 | 7002 | 7000 |
| ... | ... | ... | ... |

FIG. 7

| Time | CI-ID | Type | Diff |
|---|---|---|---|
| 9:25:13 | 7123 | CHANGE | |
| 9:25:20 | 7052 | ADD | |
| 9:26:05 | 7031 | REMOVE | |
| 9:26:17 | 7123 | CHANGE | status=inactive |
| 9:26:18 | 7809 | CHANGE | |
| 9:28:31 | 7052 | CHANGE | |
| 9:28:33 | 7052 | REMOVE | |
| 9:30:22 | 7809 | REMOVE | |

FIG. 8

|  |  | TYPE IN RETRANSMISSION LIST | | | |
|---|---|---|---|---|---|
|  |  | (NONE) | ADD | CHANGE | REMOVE |
| TYPE OF NEWLY STORED INFORMATION | ADD | ADD | - | - | - |
|  | CHANGE | CHANGE | (ADD) | CHANGE | - |
|  | REMOVE | REMOVE | (NOT SENT) | REMOVE | - |

WHEN INFORMATION OF TYPE "CHANGE" IS STORED SUBSEQUENT TO INFORMATION OF TYPE "ADD", INFORMATION OF TYPE "CHANGE" IS SENT WITH TYPE "ADD".

FIG. 10

| ID | CI-ID | status | CI-ID | status |
|---|---|---|---|---|
| 8000 | 7000 | Active | 7002 | Inactive |
| 8005 | 7000 | Active | 7008 | Inactive |
| 8012 | 7010 | Inactive | 7015 | Active |
| 8015 | 7020 | Active | 7026 | Active |
| 8018 | 7021 | Active | 7034 | Active |

FIG. 11

| ID | CI-ID | status | CI-ID | status |
|---|---|---|---|---|
| 8000 | 7000 | Active | 7002 | Inactive |
| 8005 | 7000 | Active | 7008 | Inactive |
| 8012 | 7010 | Inactive | 7015 | Active |

FIG. 14A
RETRANSMISSION LIST (BEFORE INTEGRATION)
| Time | CI-ID | Type | Diff |
|---|---|---|---|
| 9:25:13 | 7809 | CHANGE | |
| 9:40:20 | 7200 | CHANGE | status= inactive |
| 9:40:21 | 7201 | CHANGE | |
| 9:40:21 | 7202 | CHANGE | |
| 9:40:21 | 7203 | CHANGE | |
| 9:40:22 | 7204 | CHANGE | |
| 9:40:21 | 7502 | ADD | |
| 9:40:22 | 7205 | CHANGE | |
| 9:40:22 | 7206 | CHANGE | |
| 9:40:22 | 7207 | CHANGE | |
| 9:45:10 | 7433 | CHANGE | |
DELETE
FIG. 14B
RETRANSMISSION LIST (AFTER INTEGRATION)
| Time | CI-ID | Type | Diff |
|---|---|---|---|
| 9:25:13 | 7809 | CHANGE | |
| 9:40:20 | 7200 | CHANGE | status= inactive |
| 9:40:21 | 7502 | ADD | |
| 9:45:10 | 7433 | CHANGE | |

FIG. 16A

| Time | 9:25:13 |
|---|---|
| CI-ID | 7123 |
| Type | CHANGE |
| Instance id=INS_m1_10000 | |
| DiscoveredElement id=DE_m1_10000 status=inactive | |

FIG. 16B

| Time | 9:26:17 |
|---|---|
| CI-ID | 7123 |
| Type | CHANGE |
| Instance id=INS_m1_10000 | |
| DiscoveredElement id=DE_m1_10001 status=inactive | |

FIG. 16C

| Time | 9:26:17 |
|---|---|
| CI-ID | 7123 |
| Type | CHANGE |
| Instance id=INS_m1_10000 | |
| DiscoveredElement id=DE_m1_10000 status=inactive | |
| DiscoveredElement id=DE_m1_10001 status=inactive | |

COMBINE

DATA MANAGEMENT APPARATUS AND METHOD

CROSS REFERENCE TO RELATED APPLICATION(S)

This application is based upon and claims the benefit of priority of the prior Japanese Laid-open Patent Publication No. 2009-228840, filed on Sep. 30, 2009, the entire contents of which are incorporated herein by reference.

FIELD

The embodiments discussed herein relate to a data management apparatus and a data management program.

BACKGROUND

With a widespread use of high-speed communication technology and a high-speed communication network, information technology (IT) systems that provide a variety of IT services to clients by linking, for example, a Web server, an application server, a database server, and a storage to one another have been in widespread use. In such IT systems, in order to detect a failure early and manage applications executed by the servers, a data collection apparatus is used. The data collection apparatus collects configuration information regarding the servers, software, and process applications from each of the servers. In addition, a data analyzing apparatus that analyzes the configuration information collected by the data collection apparatus is used.

The IT system including the data collection apparatus is described in more detail below. For example, as shown in FIG. 24, the IT system includes a server group to be monitored, a data collection apparatus, a data management apparatus, a data analyzing apparatus, and a management console. The server group to be monitored includes server apparatuses that provide IT services to clients. As noted earlier, examples of the server apparatuses include a Web server, an application server, a database server, and a storage.

The data collection apparatus collects configuration information from each of the servers to be monitored and transmits the collected configuration information to the data management apparatus. For example, the data collection apparatus compares the collected configuration information data with the previously collected configuration information data. If a difference is found, the data collection apparatus transmits the different configuration information data to the data management apparatus.

The data management apparatus includes a configuration management database. The data management apparatus can store configuration information data received from the data collection apparatus in an integrated fashion. That is, the data management apparatus can associate the configuration information data with one another and use the information for management. Upon receiving a configuration information data from the data collection apparatus, the data management apparatus sends, to the data analyzing apparatus, a difference notification message indicating that a configuration information data that differs from the previously stored information data is newly stored.

Upon receiving the difference notification message, the data analyzing apparatus acquires the updated configuration information data from the data management apparatus. Thereafter, the data analyzing apparatus performs data analysis using the acquired configuration information data and outputs a result of the analysis (e.g., information regarding applications and processes executed by the servers and failure information) to the management console. The management console displays the result of the analysis output from the data analyzing apparatus (refer to, for example, Japanese Laid-open patent Publication No. 5-95357).

SUMMARY

Accordingly, it is an object in one aspect of the embodiment to provide even when a plurality of configuration information data to be subjected to data analysis are stored, delay of data analysis performed by the data analyzing apparatus may be prevented or at least reduced.

According to an aspect of the invention, an apparatus includes a data management apparatus comprising, a determination unit configured to determine whether an analyzing apparatus is in a communicable state when a configuration information data indicating a status of a server apparatus is received from a data collection apparatus, the data analyzing apparatus analyzing the configuration information data, an unprocessed information storage unit configured to store the received configuration information data once it is determined that data analyzing apparatus is in an incommunicable state, an integrating unit configured to integrate a plurality of configuration information data stored in the storage unit in accordance with a predetermined condition; and a notifying unit configured to send, to the analyzing apparatus, a message indicating that the data management apparatus is storing the configuration information data integrated by the integrating unit once it is determined that the data analyzing apparatus is in a communicable state.

BRIEF DESCRIPTION OF DRAWINGS

FIG. 3 illustrates an example of information included in a configuration information DB.

FIG. 4 illustrates an example of configuration information included in a field shown in FIG. 3.

FIG. 6 is a diagram illustrating an example of information stored in a parent-child relationship DB.

FIG. 7 illustrates an example of information stored a retransmission list DB.

FIG. 8 illustrates an example of information stored in an integration rule DB.

FIG. 10 illustrates an example of related configuration information data.

FIG. 11 illustrates an example of configuration information data extracted in order to identify a parent-child relationship.

FIGS. 14A and 14B illustrate an example of integration of the configuration information data using a parent-child relationship.

FIGS. 16A to 16C illustrate a merging operation performed to integrate configuration information data.

DESCRIPTION OF EMBODIMENTS

However, according to the above-described existing IT systems, if a configuration information data set (hereinafter, simply referred to as "a configuration information data") to be analyzed that has not yet been analyzed remains in the data management apparatus for a long time, a data analysis process to be performed by the data analyzing apparatus is delayed.

For example, according to the above-described existing IT systems, when the data analyzing apparatus is in an incommunicable state, a configuration information data to be subjected to data analysis remains in the data management apparatus for a long time, and a large amount of configuration information data are accumulated. Subsequently, when the data analyzing apparatus enters a communicable state, the data management apparatus sends, to the data analyzing apparatus, a large number of difference notification messages corresponding to the large amount of the configuration information data remaining in the data management apparatus. For example, when the data management apparatus stores 1000 configuration information data, the data management apparatus sends 1000 difference notification messages to the data analyzing apparatus. At that time, the data analyzing apparatus needs to receive 1000 difference notification messages, acquire 1000 configuration information data, and perform an analysis process. Accordingly, the data analyzing apparatus needs to perform a plurality of processes for receiving the difference notification messages, a plurality of processes for acquiring the updated configuration information data, and a plurality of processes for analyzing the acquired configuration information data. Consequently, the processing load imposed on the data analyzing apparatus becomes high and, therefore, the analyzing process is delayed.

As described above, when triggered by a difference notification message sent from the data collection apparatus, the data analyzing apparatus (i.e., a change in the configuration information of the servers to be monitored), the data analyzing apparatus starts data analysis. Accordingly, if a large number of configuration information data are updated, a large amount of time is needed for data analysis. Consequently, analysis of fault information that requires real-time processing may be delayed and, therefore, the recovery of the fault may be delayed. As a result, a serious trouble, such as a system shutdown, may arise.

A data management apparatus and a data management program according to embodiments of the present invention are described in detail below with reference to the accompanying drawings. Note that the present invention is not limited to the embodiments described herein.

Figure 1:
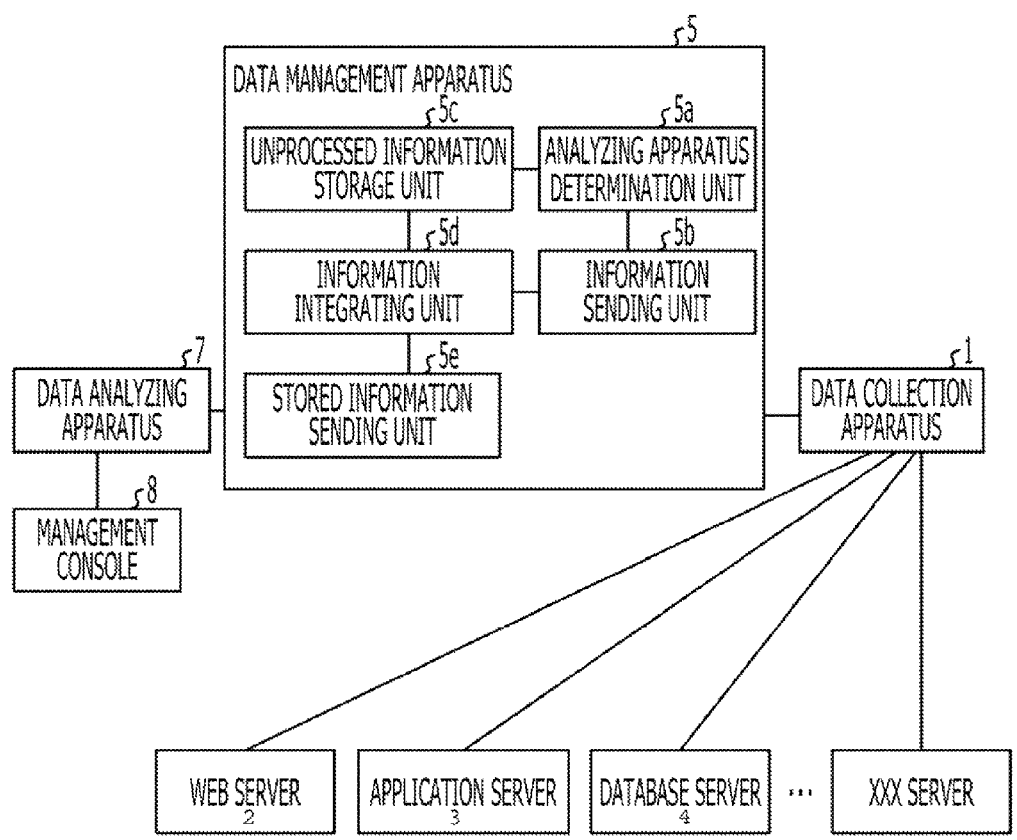
FIG. 1 illustrates an exemplary configuration of a system including a data management apparatus according to an embodiment of the present invention.

FIG. 1 illustrates an exemplary configuration of a system including a data management apparatus according to a first embodiment of the present invention. As shown in FIG. 1, the system includes a plurality of servers, such as a Web server 2, an application server 3, and a database server 4, a data collection apparatus 1, a data management apparatus 5, a data analyzing apparatus 7, and a management console 8.

The servers 2-4, such as a Web server, an application server, and a database server, form a server group used for providing various IT services to client apparatuses by executing applications that cooperate with one another. While the present embodiment is described with reference to a Web server, an application server, and a database server, the servers are not limited thereto.

According to the first embodiment, the Web server is an apparatus having a function of receiving and transmitting information over the WWW (world wide web). For example, the Web server stores HTML (HyperText Markup Language) document and images. When receiving a request, such as an HTTP (Hypertext Transfer Protocol) request, from a client apparatus through a Web browser, the Web server provides information in accordance with the received request.

The application server has a variety of functions, such as providing an execution environment of programs, connection to databases, and transaction management, and also responding to a request received from a client apparatus. For example, the application server functions as a bridge between a Web server that processes an HTTP request received from a client apparatus and a backend database server. The application server processes data.

The database server includes a database built by using, for example, a relational database management system (RDBMS). Such a database server accesses and processes data in the database in response to a data query request or a data update request received from a client apparatus and returns the result of the process to the client apparatus.

The data collection apparatus 1 collects a configuration information data from each of the servers to be monitored and sends the collected configuration information data to the data management apparatus 5. For example, the data collection apparatus 1 compares the collected configuration information data with the previously collected configuration information data. If a difference is found between the configuration information data, the data collection apparatus 1 sends the difference configuration information data to the data management apparatus 5. In addition, the data collection apparatus 1 sends a configuration information data that is not included in the previously collected configuration information data, that is, a newly generated configuration information data, to the data management apparatus 5. Furthermore, the data collection apparatus 1 sends a configuration information data that was included in the previously collected information data but is not currently collected, that is, a deleted or removed configuration information data, to the data management apparatus 5.

Still furthermore, the data collection apparatus 1 sends, to the data management apparatus 5, information indicating the type of the configuration information data together with the configuration information data. For example, the data collection apparatus 1 adds, to the configuration information data, type information indicating whether the configuration information data is updated from the previously collected configuration information data ("CHANGE"), the configuration information data is newly collected ("ADD"), or the configuration information data is deleted or removed ("REMOVE") and sends the configuration information data.

The data management apparatus 5 is a server that may include a configuration management database (CMDB). The data management apparatus 5 may store the configuration information data received from the data collection apparatus 1 in an integrated fashion and manages the configuration information data in association with one another. Upon receiving a configuration information data from the data collection apparatus 1, the data management apparatus 5 sends, to the data analyzing apparatus 7, a difference notification message indicating that the configuration information data differs from the previously collected configuration information data, that is, a newly updated configuration information data has been received.

As shown in FIG. 1, the data management apparatus 5 includes an analyzing apparatus determination unit 5a, an information sending unit 5b, an unprocessed information storage unit 5c, an information integrating unit 5d, and a stored information sending unit 5e. Each of these units may be implemented via execution of software program(s) by a processor in the server that serves as the data management apparatus 5. The software program(s) may be stored on a computer readable medium or media in the server. Examples of such a computer readable medium includes but not limited to an optical disk in a hard disk drive, an optical disk drive, a read-only memory (ROM), and a random access memory (RAM).

Upon receiving a configuration information data indicating the status of a server that provides a variety of services from the data collection apparatus 1, the analyzing apparatus determination unit 5a determines whether the data analyzing apparatus 7 that analyzes the configuration information is in a communicable state. For example, upon receiving a configuration information data from the data collection apparatus 1, the analyzing apparatus determination unit 5a determines whether the data analyzing apparatus 7 is functioning or out of function using, for example, ICMP (Internet Control Message Protocol) or SNMP (Simple Network Management Protocol). It should be noted that a method for examining whether the data analyzing apparatus 7 is functioning or out of function is not limited to the above-described method. A variety of other methods may be used.

If the analyzing apparatus determination unit 5a determines that the data analyzing apparatus 7 is in a communicable state, the information sending unit 5b sends, to the data analyzing apparatus 7, a message indicating that it has received a configuration information data. For example, the information sending unit 5b stores, in, for example, a database, the configuration information data received when the data analyzing apparatus 7 is in a communicable state.

However, if the analyzing apparatus determination unit 5a determines that the data analyzing apparatus 7 is in an incommunicable state, the unprocessed information storage unit 5c stores the received configuration information data therein. For example, the unprocessed information storage unit 5c stores configuration information data that have not yet been subjected to the analysis process performed by the data analyzing apparatus 7 among the configuration information data received from the data collection apparatus 1. For example, when the data analyzing apparatus 7 is in a communicable state and if the data management apparatus 5 receives a configuration information data from the data collection apparatus 1, the data management apparatus 5 sends, to the data analyzing apparatus 7, a message indicating that the configuration information data has been updated. Upon receiving the message, the data analyzing apparatus 7 acquires the configuration information data that has been received and stored by the data management apparatus 5 and performs data analysis on the configuration information data.

However, when the data analyzing apparatus 7 is in an incommunicable state and if the data management apparatus 5 receives a configuration information data from the data collection apparatus 1, the data management apparatus 5 cannot send the message to the data analyzing apparatus 7. Accordingly, the data analyzing apparatus 7 cannot acquire the configuration information data newly stored in the data management apparatus 5 and, therefore, cannot perform data analysis. Thus, if the data analyzing apparatus 7 is in an incommunicable state, the unprocessed information storage unit 5c stores the configuration information data received from the data collection apparatus 1.

The information integrating unit 5d integrates the configuration information data stored in the unprocessed information storage unit 5c in accordance with a predetermined condition. For example, when the data analyzing apparatus 7 enters a communicable state from an incommunicable state, the information integrating unit 5d integrates the configuration information data stored in the unprocessed information storage unit 5c using an integration rule determined by an administrator and the dependency relationship among the configuration information data. In this way, the information integrating unit 5d reduces the number of the configuration information data to be sent to the data analyzing apparatus 7 from the number of the configuration information data received when the data analyzing apparatus 7 is in an incommunicable state.

When the data analyzing apparatus 7 enters a communicable state from an incommunicable state, the stored information sending unit 5e sends, to the data analyzing apparatus 7, a message indicating that the stored information sending unit 5e is storing the configuration information data integrated by the information integrating unit 5d. For example, when the data analyzing apparatus 7 enters a communicable state from an incommunicable state and if the information integrating unit 5d has completed the integration process, the stored information sending unit 5e sends, to the data analyzing apparatus 7, a difference notification message indicating that the stored information sending unit 5e stores an integrated configuration information data.

Upon receiving the difference notification message indicating that the data management apparatus 5 is storing an integrated configuration information data, the data analyzing apparatus 7 acquires the updated configuration information data from the data management apparatus 5. Thereafter, the data analyzing apparatus 7 performs data analysis using the acquired configuration information data and outputs the result of the data analysis to the management console 8. Examples of the result of the data analysis include the information regarding applications and processes executed on the servers and fault information. The management console 8 is formed from a computer that displays the result of the analysis performed by the data analyzing apparatus 7.

In this way, according to the first embodiment, when the data analyzing apparatus 7 is in an incommunicable state, the data management apparatus 5 may integrate a large number of the stored configuration information data into a small number of the configuration information data. Subsequently, when the data analyzing apparatus 7 enters a communicable state, the data management apparatus 5 sends, to the data analyzing apparatus 7, a difference notification message regarding a small number of generated configuration information data. As a result, the data analyzing apparatus 7 need not perform a plurality of processes for receiving a difference notification message, a plurality of processes for acquiring the updated configuration information data, and a plurality of processes for analyzing the acquired configuration information data and, therefore, the overload of processing may be prevented or at least reduced. That is, according to the first embodiment, even when a plurality of configuration information data to be subjected to data analysis are stored, delay of data analysis performed by the data analyzing apparatus 7 may be prevented or at least reduced.

Note that each of the apparatuses of the system according to the first embodiment may include a processing unit, such as a computer processor, in addition to those processing units already described in the first embodiment. Thus, according to a second embodiment, the configuration of a system in which each of the data collection apparatus, the data management apparatus, and data analyzing apparatus according to the first embodiment includes an additional processing unit is described. However, the management console is formed from a computer that displays the result of data analysis, and the configuration of the computer is similar to that of a widely used computer. Accordingly, description of the details of the management console is not provided.

[Configuration of Data Collection Apparatus]

Figure 2:
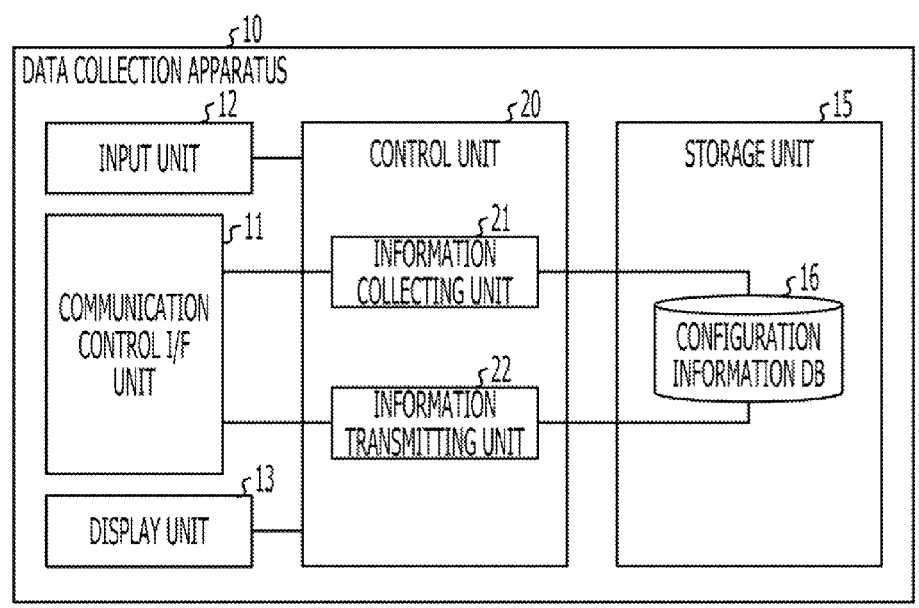
FIG. 2 is a block diagram of a data collection apparatus according to a second embodiment of the present invention.

An exemplary configuration of a data collection apparatus according to the second embodiment is described below with reference to FIG. 2. FIG. 2 is a block diagram of the data collection apparatus according to the second embodiment. As shown in FIG. 2, a data collection apparatus 10 (such as the data collection apparatus 1 shown in FIG. 1) includes a communication control interface (I/F) unit 11, an input unit 12, a display unit 13, a storage unit 15, and a control unit 20.

The communication control I/F unit 11 serves as an interface having at least one communication port. The communication control I/F unit 11 controls information communicated between the data collection apparatus and a different apparatus. For example, the communication control I/F unit 11 receives a configuration information data from each of the servers and transmits a configuration information data stored in a configuration information DB 16 (described below) to a data management apparatus 50.

The input unit 12 includes, for example, a keyboard, a mouse, and a microphone. The input unit 12 receives information, such as an instruction to start collecting a configuration information data and the destination of the configuration information data. Thereafter, the input unit 12 inputs the information to the control unit 20 described below. Note that the display unit 13 (described below) provides a pointing device function in cooperation with the mouse. The display unit 13 includes, for example, a monitor, a display, a touch panel, and a speaker. The display unit 13 displays, for example, the configuration information collected from the servers and stored in the storage unit 15.

The storage unit 15 stores data and programs required by the control unit 20 that performs a variety of processes. The storage unit 15 further stores the configuration information DB 16. A storage device, such as a semiconductor memory device or a hard disk, may be used as the storage unit 15.

The configuration information DB 16 stores a configuration information data collected from each of the servers that executes an application and that provides a service. For example, as shown in FIG. 3, the configuration information DB 16 includes information fields "CI-ID", "application name", "configuration information", and "update date" including data "7000", "Web1", "ID·status . . . ", and "2009/8/7", respectively. In addition, the information fields "CI-ID", "application name", "configuration information", and "update date" includes data "7025", "Appl1", "ID·status . . . ", and "2009/7/20", respectively. FIG. 3 illustrates an example of information included in the configuration information DB 16.

The information field "CI-ID" includes an identifier (Configuration ID) that uniquely identifies a configuration information data. The information field "application name" includes the name of an application running on a server. The information field "update date" includes the date on which a configuration information data identified by "configuration information" is updated using a configuration information data received by the data collection apparatus 10.

The configuration information data is represented by information shown in FIG. 4. The configuration information data includes the name of a process of an application currently running on the server and information regarding a deployed application running on the application. FIG. 4 illustrates an example of information included in the field "configuration information" shown in FIG. 3.

In FIG. 4, the term "Instance" shown in "Instance, id=INS_m1__10000, name=Appl1, status=active" indicates that this information is instance information of the application. "id" indicates an identifier that uniquely identifies the application. In addition, "name" indicates the name of the application. "status" indicates the status of the application. That is, FIG. 4 illustrates information collected from an application server. "id=INS_m1__10000" indicates that this information is the instance information regarding the application "Appl1" and having an ID of "INS_m1__10000" assigned to the instance information.

Furthermore, the instance information shown in FIG. 4 includes two fields "Composing Process" and two fields "Discovered Element". The field "Composing Process" indicates instance information regarding a process running on an operating system (OS) of a server. The field "Composing Process" includes sub-fields "id", "pid", and "status". The sub-field "id" indicates an identifier that identifies the "Composing process". The sub-field "pid" indicates an identifier that identifies a process. The sub-field "status" indicates the status of the process. For example, when the process is normally operating, the sub-field "status" includes "active". However, when the process is abnormally operating or is stopped, the sub-field "status" includes "inactive".

The field "Discovered Element" indicates instance information regarding a deployed application running on server software, server middleware, and a server application. The field "Discovered Element" includes sub-fields "id", "name", "status", and "type". The sub-field "id" indicates an identifier that identifies the "Discovered Element". The sub-field "name" indicates the name of the deployed application. The sub-field "status" indicates the status of the deployed application. For example, when the process is normally operating, the sub-field "status" includes "active". However, when the process is abnormally operating or is stopped, the sub-field "status" includes "inactive". The sub-field "type" indicates the type of server, such as an application server, from which information is collected or the type of deployed application, such as "java container", "webmodule", or "workunit". However, such information is only illustrative. The configuration information is not limited thereto. For example, a variety of types of information, such as information regarding a drive, the directory, and the file structure of a server, may be used as the configuration information.

In addition, the configuration information DB 16 may contain the previously collected configuration information data by identifying one of the tables using a collection date. Accordingly, the configuration information DB 16 may include only the immediately previously collected configuration information data as a previously collected configuration information data. Alternatively, the configuration information DB 16 may include a plurality of previously collected configuration information data for a predetermined period of time.

The control unit 20 may be formed from an electronic circuit, such as a central processing unit (CPU) or a micro processing unit (MPU). The control unit 20 includes an internal memory for storing control programs, such as an OS, a program defining the sequence of various processes, and required data. In addition, the control unit 20 includes an information collecting unit 21 and an information transmitting unit 22. Thus, the control unit 20 performs a variety of processes.

When the time set by an administrator is reached, the information collecting unit 21 accesses each of the servers that executes an application and provides a business application to a client and collects the configuration information data. The information collecting unit 21 then stores the collected configuration information data in the configuration information DB 16. The configuration information data may be collected at any time. For example, the configuration information data may be collected when an instruction to collect the configuration information data is input to the input unit 12 or a predetermined time is reached (e.g., once every hour).

The information transmitting unit 22 sends, to the data management apparatus 50, the configuration information data collected by the information collecting unit 21 and stored in the configuration information DB 16. For example, the information transmitting unit 22 acquires, from the configuration information DB 16, the configuration information data collected by the information collecting unit 21, that is, the currently collected configuration information data. Thereafter, if a difference is found between the currently collected configuration information data and the previously collected configuration information data, the information transmitting unit 22 transmits the configuration information data having the difference to the data management apparatus 50. As used herein, the term "difference" also refers to a newly collected configuration information data that is not included in the previously collected configuration information data. In addition, the term "difference" refers to a configuration information data that is included in the previously collected configuration information and that is not included in the currently collected configuration information, that is, a configuration information data that has been deleted.

The information transmitting unit 22 having such a function attaches, to the configuration information data, type information indicating what type of configuration information the configuration information data to be sent is. Thereafter, the information transmitting unit 22 sends the configuration information to the data management apparatus 5. For example, the information transmitting unit 22 attaches the following type information to the configuration information: a type "CHANGE" indicating that the configuration information is updated from the previously collected configuration information, a type "ADD" indicating that the configuration information is newly collected, and a type "REMOVE" indicating that the configuration information is deleted. Thereafter, the information transmitting unit 22 sends the configuration information data.

[Configuration of Data Management Apparatus]

Figure 5:
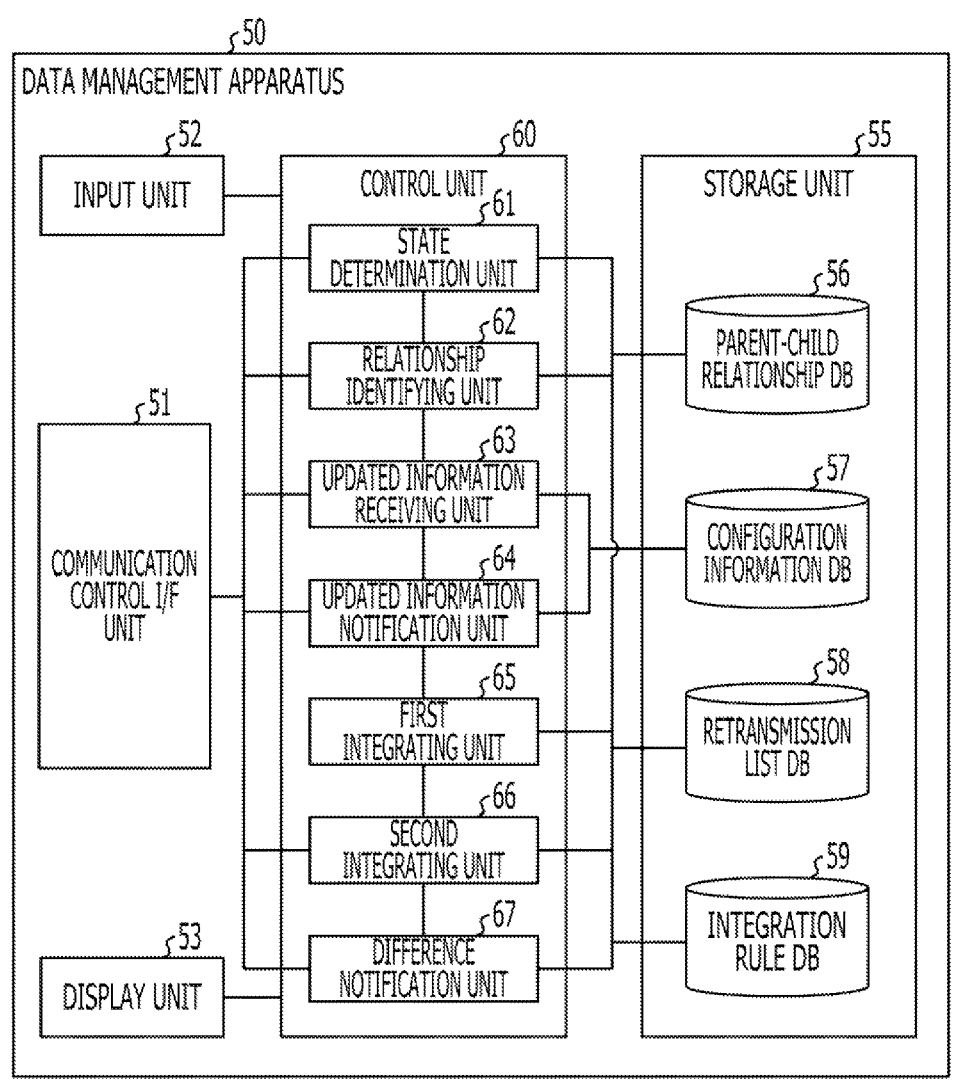
FIG. 5 is a block diagram illustrating the configuration of a data management apparatus according to the second embodiment.

An exemplary configuration of the data management apparatus according to the second embodiment is described next with reference to FIG. 5. FIG. 5 is a block diagram illustrating the configuration of the data management apparatus according to the second embodiment. As shown in FIG. 5, the data management apparatus 50 includes a communication control I/F unit 51, an input unit 52, a display unit 53, a storage unit 55, and a control unit 60.

The communication control I/F unit 51 serves as an interface having at least one communication port. The communication control I/F unit 51 controls information communicated between the data management apparatus and a different apparatus. For example, the communication control I/F unit 51 receives a configuration information data from the data collection apparatus 10 and sends a difference notification message (described below) to a data analyzing apparatus 70.

The input unit 52 includes, for example, a keyboard, a mouse, and a microphone. The input unit 52 receives, for example, an instruction to start the system, stop the system, or start integrating the configuration information data. Thereafter, the input unit 52 inputs the information to the control unit 60 described below. Note that the display unit 53 (described below) provides a pointing device function in cooperation with the mouse. The display unit 53 includes, for example, a monitor, a display, a touch panel, and a speaker. The display unit 53 displays, for example, the configuration information stored in the storage unit 55 and the result of a process of integrating configuration information data performed by the control unit 60.

The storage unit 55 stores, for example, data and programs required by the control unit 60 for performing a variety of processes. The storage unit 55 further stores a parent-child relationship DB 56, a configuration information DB 57, a retransmission list DB 58, and an integration rule DB 59. A storage device, such as hard disk, may be used as the storage unit 55.

The parent-child relationship DB 56 stores a parent-child relationship among configuration information data identified by a relationship identifying unit 62 described below. For example, as shown in FIG. 6, the parent-child relationship DB 56 includes information fields "ID", "CI-ID", "CI-ID", and "parent object" including data "8000", "7000", "7002", and "7000", respectively. FIG. 6 is a diagram illustrating an example of information stored in the parent-child relationship DB 56. The "ID" field includes an identifier uniquely identifying a pair of configuration information data having a relationship. The "CI-ID" field includes a configuration ID, which uniquely identifies a configuration information data. The "parent object" field includes the CI-ID of one of the configuration information data of the pair which is identified as a parent. Accordingly, in FIG. 6, the configuration information data having a CI-ID of 7000 serves as a parent of the configuration information data having a CI-ID of 7002.

The configuration information DB 57 associates a configuration information data regarding each of the servers that provide services which is collected by the data collection apparatus 10 with an application running on the server (refer to FIG. 3). Thereafter, the configuration information DB 57 stores the configuration information data therein. For example, by updating the latest configuration information data collected by the data collection apparatus 10, the configuration information DB 57 may store the even more latest configuration information data.

Among the configuration information data received from the data collection apparatus 10 and indicating the statuses of the servers that provide a variety of services, the retransmission list DB 58 stores the configuration information data that have not been subjected to an analyzing process performed by the data analyzing apparatus 70. For example, as shown in FIG. 7, the retransmission list DB 58 includes a "Time" field, a "CI-ID" field, a "Type" field, and a "Diff" field, which include "9:25:13", "7123", "CHANGE", and "configuration information" and "9:25:20", "7052", "ADD", and "configuration information", respectively. That is, FIG. 7 illustrates an example of information stored in the retransmission list DB 58.

The "time" field represents the date and time at which the configuration information data is received from the data collection apparatus 10. The "CI-ID" field represents a configuration ID, which uniquely identifies a configuration information data. The "Type" field represents the type information that is attached to the configuration information data by the data collection apparatus 10. The "Diff" field represents data to be subjected to an integration process performed by a second integrating unit 66 described below. In the above-described example, the "Diff" field indicates the instance information shown in FIG. 4.

The integration rule DB 59 stores integration rule(s) used when configuration information data indicating the statuses of the servers that provide a variety of services are integrated. For example, as shown in FIG. 8, the integration rule DB 59 stores a rule used for associating data in a "type in retransmission list" field with data in a "type of newly stored information" field. The field "type in the retransmission list" indicates the types of the configuration information data that have already been stored in the retransmission list DB 58. The field "type of newly stored information" indicates the types of the configuration information data that are newly stored in the retransmission list DB 58. That is, FIG. 8 illustrates an example of information stored in the integration rule DB 59. The integration rule DB 59 and integration rule(s) stored therein are accessible by the information integrating unit 5d (FIG. 1) to integrate the configuration information data stored in the unprocessed information storage unit 5c.

For example, the integration rule shown in FIG. 8 is described next with reference to the configuration information data having a CI-ID of 7000. A state in which the configuration information data having a CI-ID of 7000 is not stored in the retransmission list DB 58 is described first. In this state, if the configuration information data having a CI-ID of 7000 and having the type information "ADD" is stored in the retransmission list DB 58, the newly stored configuration information data having the type information "ADD" is to be transmitted to the data analyzing apparatus 70. Similarly, if the configuration information data having a CI-ID of 7000 and having the type information "CHANGE" is stored in the retransmission list DB 58, the newly stored configuration information data having the type information "CHANGE" is to be transmitted to the data analyzing apparatus 70. If the configuration information data having a CI-ID of 7000 and having the type information "REMOVE" is stored in the retransmission list DB 58, the newly stored configuration information data having the type information "REMOVE" is to be transmitted to the data analyzing apparatus 70.

Subsequently, a state in which the configuration information data having a CI-ID of 7000 and having the type information "ADD" is stored in the retransmission list DB 58 is described. In this state, if the configuration information data having a CI-ID of 7000 and having the type information "CHANGE" is newly stored in the retransmission list DB 58, the newly stored configuration information data having the type information "CHANGE" is to be transmitted to the data analyzing apparatus 70 as a configuration information data having the type information "ADD". In contrast, if the configuration information data having a CI-ID of 7000 and having the type information "REMOVE" is newly stored in the retransmission list DB 58, the newly stored configuration information data having a CI-ID of 7000 is not transmitted to the data analyzing apparatus 70. Note that, in this state, a configuration information data having a CI-ID of 7000 and having the type information "ADD" is not newly stored in the retransmission list DB 58. Accordingly, this state does not appear in the rule.

Subsequently, a state in which the configuration information data having a CI-ID of 7000 and having the type information "CHANGE" is stored in the retransmission list DB 58 is described. In this state, when the configuration information data having a CI-ID of 7000 and having the type information "CHANGE" is newly stored in the retransmission list DB 58, the already stored configuration information data having the type information "CHANGE" is merged with the newly stored configuration information data having the type information "CHANGE". Thereafter, the merged configuration information data is to be transmitted to the data analyzing apparatus 70. In contrast, if the configuration information data having a CI-ID of 7000 and having the type information "REMOVE" is newly stored in the retransmission list DB 58, the already stored configuration information data having the type information "CHANGE" is merged with the newly stored configuration information data having the type information "CHANGE". Thereafter, the merged configuration information data is to be transmitted to the data analyzing apparatus 70 as a configuration information data having the type information "REMOVE". Note that in this state, a configuration information data having a CI-ID of 7000 and having the type information "ADD" is not newly stored in the retransmission list DB 58. Accordingly, this state does not appear in the rule.

Subsequently, a state in which the configuration information data having a CI-ID of 7000 and having the type information "REMOVE" is stored in the retransmission list DB 58 is described. In this state, a configuration information data of any type is not newly stored in the retransmission list DB 58. Accordingly, this state does not appear in the rule.

The control unit 60 may be formed from an electronic circuit, such as a central processing unit (CPU) or a micro processing unit (MPU). The control unit 60 includes an internal memory for storing control programs, such as an OS, a program defining the sequence of various processes, and required data. In addition, the control unit 60 includes a status determination unit 61, the relationship identifying unit 62, an updated information receiving unit 63, an updated information notification unit 64, a first integrating unit 65, a second integrating unit 66, and a difference notification unit 67. These units may be implemented via execution by the control unit 60 by one or more programs stored in the internal memory of the control unit 60. Thus, the control unit 60 performs a variety of processes.

The status determination unit 61 determines whether the configuration information data collected by the data collection apparatus 10 is dynamic information that changes the status of the configuration information data or static information that does not change the status of the configuration information data. For example, when the data management apparatus 50 is started, the status determination unit 61 sets all of the configuration information data to information "Static" having a static characteristic. After a predetermined period of time has elapsed, the status determination unit 61 sets the configuration information data having changed statuses to information "Dynamic." In this way, the status determination unit 61 determines whether the configuration information data collected by the data collection apparatus 10 is static information or dynamic information. Thereafter, the status determination unit 61 sends the result of determination to the data analyzing apparatus 70.

Figure 9:
FIG. 9 illustrates a process for identifying configuration information data having a dynamic characteristic.

For example, as shown in FIG. 9, when the apparatus is started, the status determination unit 61 considers all of the configuration information data input by the administrator as static information. Thereafter, after 10 minutes, for example, has elapsed, the status determination unit 61 sets the configuration information data having changed statuses to dynamic information. In the example shown in FIG. 9, the status determination unit 61 determines that the configuration information data Process, LogicalServer, Package, Instance, Logical ServerPerformance, ProcessPerformance, and LogicalServiceSoket have a dynamic characteristic and determines that configuration information data InstalledSoftware and LogicalServerEventLog have a static characteristic. While the above example (e.g., the example shown in FIG. 4) has been described with reference to instance information (Instance) serving as the configuration information, the configuration information includes various information data in addition to the instance information data, as shown in FIG. 9. That is, FIG. 9 illustrates a process for identifying configuration information data having a dynamic characteristic.

The relationship identifying unit 62 selects the configuration information data determined to be dynamic information by the status determination unit 61 from among the configuration information data stored in the retransmission list DB 58. Thereafter, the relationship identifying unit 62 identifies a dependency relationship among the selected configuration information data. For example, the relationship identifying unit 62 selects the configuration information data determined to be dynamic information by the status determination unit 61 from among the configuration information data stored in the retransmission list DB 58. Thereafter, the relationship identifying unit 62 identifies a relationship between two of the selected dynamic configuration information data. Subsequently, the relationship identifying unit 62 searches for a pair of the configuration information data that are linked with the relationship and that have different statuses. Subsequently, after a predetermined period of time has elapsed, the relationship identifying unit 62 determines whether the status of the configuration information data is changed. The relationship identifying unit 62 then determines that a pair that has not been changed has a parent-child relationship and stores the determined relationship in the parent-child relationship DB 56. At substantially the same time, the relationship identifying unit 62 sends the relationship information to the data analyzing apparatus 70.

For example, assume that the relationship identifying unit 62 determines the relation between dynamic configuration information data as shown in FIG. 10. In FIG. 10, "ID" represents an identifier that uniquely identifies a pair of configuration information data having a relationship. "CI-ID" represents a configuration ID that uniquely identifies a configuration information data. "status" represents the status of the configuration information data. Accordingly, in FIG. 10, the configuration information data having a CI-ID of 7000 and a "status" of "active" has a relationship with the configuration information data having a CI-ID of 7002 and a "status" of "inactive". The pair of configuration information data is identified by ID=8000. Similarly, the configuration information data having a CI-ID of 7000 and a "status" of "active" has relation with the configuration information data having a CI-ID of 7008 and a "status" of "inactive". The pair of configuration information data is identified by ID=8005. The configuration information data having a CI-ID of 7010 and a "status" of "inactive" has relation with the configuration information data having a CI-ID of 7015 and a "status" of "active". The pair of configuration information data is identified by ID=8012. The configuration information data having a CI-ID of 7020 and a "status" of "active" has relation with the configuration information data having a CI-ID of 7026 and a "status" of "active". The pair of configuration information data is identified by ID=8015. In addition, the configuration information data having a CI-ID of 7021 and a "status" of "active" has relation with the configuration information data having a CI-ID of 7034 and a "status" of "active". The pair of configuration information data is identified by ID=8018.

In order to find relation between the configuration information data, information input from the administrator may be used. Alternatively, by layering the IDs of the configuration information data in advance, a relationship may be found. For example, by using "7000-1" and "7000-2" as the IDs of the configuration information data, a relationship may be found.

Subsequently, the relationship identifying unit 62 extracts, from the related configuration data illustrated in FIG. 10, the pairs of configuration information data that have different statuses (i.e., the pairs having IDs of 8000, 8005, and 8012). Thereafter, the relationship identifying unit 62 generates a table shown in FIG. 11. Subsequently, the relationship identifying unit 62 identifies a parent-child relationship for the pair having an ID of 8000 and a status that is not changed after a predetermined period of time has elapsed. For example, the relationship identifying unit 62 identifies a parent-child relationship in which the configuration information data having a CI-ID of 7000 and a status of "active" serves as a "parent" and the configuration information data having a CI-ID of 7002 and a status of "inactive" serves as a "child" (refer to FIG. 6). That is, FIG. 10 illustrates an example of related configuration information data. FIG. 11 illustrates an example of the configuration information data extracted in order to identify a parent-child relationship.

In addition, depending on the configuration information data, a rule in which only one parent exists for a plurality of the configuration information data related to one configuration information data may be applied. In such a case, if one parent-child relationship is identified, other parent-child relationships are automatically identified. Accordingly, it is not necessary to determine all of the relationships among the related configuration information data.

Figures 12A, 12B:
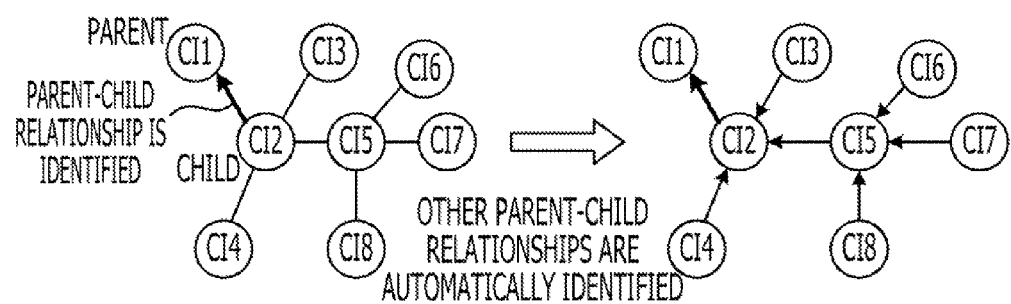
FIGS. 12A and 12B illustrate an example of a process in which parent-child relationships are sequentially determined.

For example, suppose that the dynamic configuration information data among the configuration information data stored in the retransmission list DB 58 have a relation shown in FIG. 12A. For example, a configuration information data CI1 has a relation with a configuration information data CI2. A configuration information data CI2 has a relation with a configuration information data CI3. A configuration information data CI2 has a relation with a configuration information data CI4. A configuration information data CI2 has a relation with a configuration information data CI5. A configuration information data CI5 has a relation with a configuration information data CI6. A configuration information data CI5 has a relation with a configuration information data CI7. A configuration information data CI5 has a relation with a configuration information data CI8. If the relationship identifying unit 62 identifies, in the relation between the configuration information data CI1 and CI2, a parent-child relationship in which the configuration information data CI1 serves as a parent and the configuration information data CI2 serves as a child, the relationship identifying unit 62 may automatically identify other parent-child relationships, as shown in FIG. 12B. That is, since the relationship identifying unit 62 determines that the configuration information data CI1 is the topmost parent, the relationship identifying unit 62 may determine that the configuration information data CI2 is a parent of the configuration information data CI3, CI4, and CI5. In addition, the relationship identifying unit 62 may determine that the configuration information data CI5 is a parent of the configuration information data CI6, CI7, and CI8. That is, FIGS. 12A and 12B illustrate an example of a process in which parent-child relationships are sequentially determined.

The updated information receiving unit 63 receives a configuration information data from the data collection apparatus 10 and stores the received configuration information data in the configuration information DB 57 or the retransmission list DB 58. For example, the updated information receiving unit 63 determines whether the data analyzing apparatus 70 is communicable using the ICMP or SNMP at predetermined intervals (e.g., 10-minute intervals). If the updated information receiving unit 63 determines that the data analyzing apparatus 70 is communicable, the updated information receiving unit 63 stores the configuration information data received from the data collection apparatus 10 in the configuration information DB 57 and sends, to the updated information notification unit 64, a message indicating that a configuration information data has been stored. However, if the updated information receiving unit 63 determines that the data analyzing apparatus 70 is not communicable due to, for example, system down, the updated information receiving unit 63 stores the configuration information data received from the data collection apparatus 10 in the configuration information DB 57 and the retransmission list DB 58. Thereafter, when the data analyzing apparatus 70 enters a communicable state from an incommunicable state, the updated information receiving unit 63 sends, to the first integrating unit 65, the second integrating unit 66, and the difference notification unit 67, a message indicating that the data analyzing apparatus 70 enters a communicable state.

Upon receiving, from the updated information receiving unit 63, a message indicating that a configuration information is newly stored in the configuration information DB 57, the updated information notification unit 64 sends a request to acquire the newly stored configuration information data to the data analyzing apparatus 70. That is, each time a configuration information data is stored in the configuration information DB 57 when it is determined that the data analyzing apparatus 70 is in a communicable state, the updated information notification unit 64 sends a request to the data analyzing apparatus 70 to acquire the stored configuration information data. At that time, the updated information notification unit 64 appends information used for identifying the configuration information data (e.g., a CI-ID) to the acquiring request and sends the request to the data analyzing apparatus 70.

The first integrating unit 65 integrates the configuration information data stored in the retransmission list DB 58 using a relationship between the configuration information data identified by the relationship identifying unit 62 and changes in statuses of the dynamic configuration information data. For example, the first integrating unit 65 receives, from the updated information receiving unit 63, a message indicating that the data analyzing apparatus 70 enters a communicable state from an incommunicable state. Thereafter, when the parent configuration information data enters an "inactive" mode, the first integrating unit 65 deletes the related child configuration information data having a dynamic characteristic from the retransmission list DB 58 by using such characteristics of configuration information data. In this way, the configuration information data received when the data analyzing apparatus 70 is in an incommunicable state may be integrated and, therefore, the number of configuration information data to be sent to the data analyzing apparatus 70 may be reduced.

Figure 13:
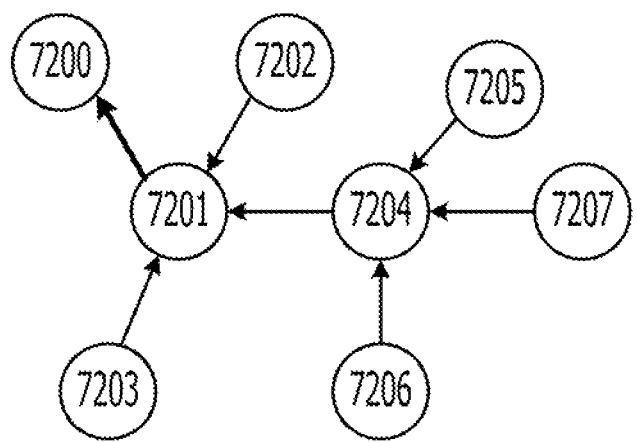
FIG. 13 illustrates an example of a parent-child relationship.

For example, as shown in FIG. 13, the configuration information data "7200" is the topmost parent that has a child "7201". The configuration information data "7201" is a parent of the configuration information data "7202", "7203", and "7204". The configuration information data "7204" is a parent of the configuration information data "7205", "7206", and "7207". In addition, as shown in FIG. 14A, the retransmission list DB 58 includes 11 lines, that is, 11 configuration information data having CD-IDs of "7809", "7200", "7201", "7202", "7203", "7204", "7502", "7205", "7206", "7207", and "7433" in time sequential order. The "status" of the configuration information data "7200" indicates "inactive".

In such a case, since the status of the topmost parent "7200" has a status of "inactive", the first integrating unit 65 deletes the configuration information data "7201" to "7207", which are the children of the configuration information data "7200", from the retransmission list DB 58. As a result, as shown in FIG. 14B, the 11 the configuration information data may be integrated into 4 configuration information data. That is, FIG. 13 illustrates an example of a parent-child relationship, and FIGS. 14A and 14B illustrate an example of integration of the configuration information data using a parent-child relationship.

The second integrating unit 66 integrates the configuration information data stored in the retransmission list DB 58 using the integration rule stored in the integration rule DB 59. For example, the second integrating unit 66 receives, from the updated information receiving unit 63, a message indicating that the data analyzing apparatus 70 enters a communicable state from an incommunicable state. The second integrating unit 66 then integrates the configuration information data stored in the retransmission list DB 58 using the integration rule identified by the types of the configuration information data already stored in the retransmission list DB 58 and the types of the configuration information data newly stored in the retransmission list DB 58.

Figures 15A, 15B:
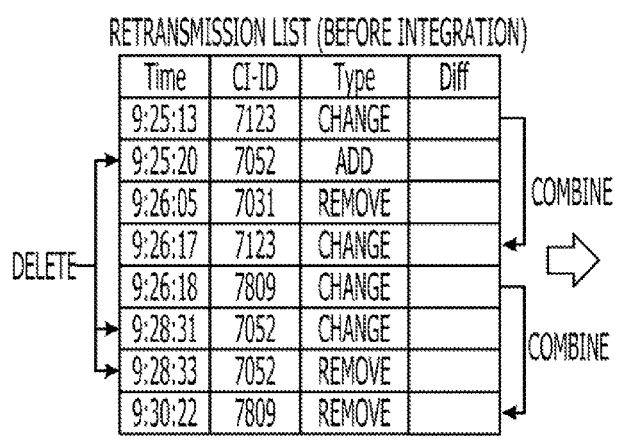
FIGS. 15A and 15B illustrate an example of integration using an integration rule.

For example, as shown in FIG. 15A, the retransmission list DB 58 stores eight configuration information data. For example, as information of "CD-ID, Type", the retransmission list DB 58 includes "7123, CHANGE", "7123, CHANGE", "7052, ADD", "7031, REMOVE", "7123, CHANGE", "7809, CHANGE", "7052, CHANGE", "7052, REMOVE", and "7809, REMOVE" in time sequential order.

In such a case, since "7052, REMOVE" is accumulated subsequent to "7052, ADD" in the second line from the top, the second integrating unit 66 removes the configuration information data "7052" from the configuration information data to be transmitted in accordance with the integration rule. In addition, since "7123, CHANGE" is accumulated subsequent to "7123, CHANGE" in the first line from the top, the second integrating unit 66 merges (integrates) these two information data into "7123, CHANGE", which is to be transmitted. Furthermore, since "7809, REMOVE" is accumulated subsequent to "7809, CHANGE" in the fifth line from the top, the second integrating unit 66 merges (integrates) these two information data into "7809, REMOVE", which is to be transmitted. Note that since "7031, REMOVE" does not have the same configuration information in the following lines, the second integrating unit 66 regards that information as information to be sent without merging that information. As a result, as shown in FIG. 15B, the second integrating unit 66 may reduce the eight configuration information data to be transmitted to three configuration information data. That is, FIGS. 15A and 15B illustrate an example of integration using the integration rule.

The merging operation of the configuration information data is described next. The second integrating unit 66 merges the configuration information data having a type of "CHANGE" shown in FIG. 16A and the configuration information data having a type of "CHANGE" shown in FIG. 16B. In such a case, as shown in FIG. 16C, the second integrating unit 66 generates a new configuration information data by integrating the configuration information data shown in FIGS. 16A and 16B and regards the generated configuration information data as a configuration information data to be transmitted. That is, FIGS. 16A to 16C illustrate a merging operation performed to integrate configuration information data.

Note that either the first integrating unit 65 or the second integrating unit 66 may be executed first. Alternatively, only one of the first integrating unit 65 and the second integrating unit 66 may be executed. Still alternatively, the first integrating unit 65 may be integrated into the second integrating unit 66, and the first integrating unit 65 and the second integrating unit 66 may be executed at the same time.

When the data analyzing apparatus 70 enters a communicatable state, the difference notification unit 67 sends, to the data analyzing apparatus 70, a message indicating that the difference notification unit 67 is storing the configuration information data integrated by the first integrating unit 65 or the second integrating unit 66. For example, the difference notification unit 67 receives, from the updated information receiving unit 63, a message indicating that the data analyzing apparatus 70 enters a communicatable state and further receives, from the first integrating unit 65 or the second integrating unit 66, a message indicating that the integrating operation has been completed. At that time, the difference notification unit 67 attaches the CD-ID of each of the configuration information data stored in the retransmission list DB 58 to a difference notification message indicating that the difference notification unit 67 stores the integrated configuration information and sends the difference notification message to the data analyzing apparatus 70.

That is, the difference notification unit 67 sends, to the data analyzing apparatus 70, a difference notification message indicating that the configuration information data that was collected when the data analyzing apparatus 70 was in an incommunicable state and that has not been subjected to an analysis process. At that time, the difference notification unit 67 may send a number of difference notification messages equal to the number of the configuration information data stored in the retransmission list DB 58. The difference notification messages have information for identifying the configuration information data (e.g., the CI-ID) attached thereto. Alternatively, the difference notification unit 67 may send a difference notification message including the CD-IDs of all of the configuration information data stored in the retransmission list DB 58.

[Configuration of Data Analyzing Apparatus]

Figure 17:
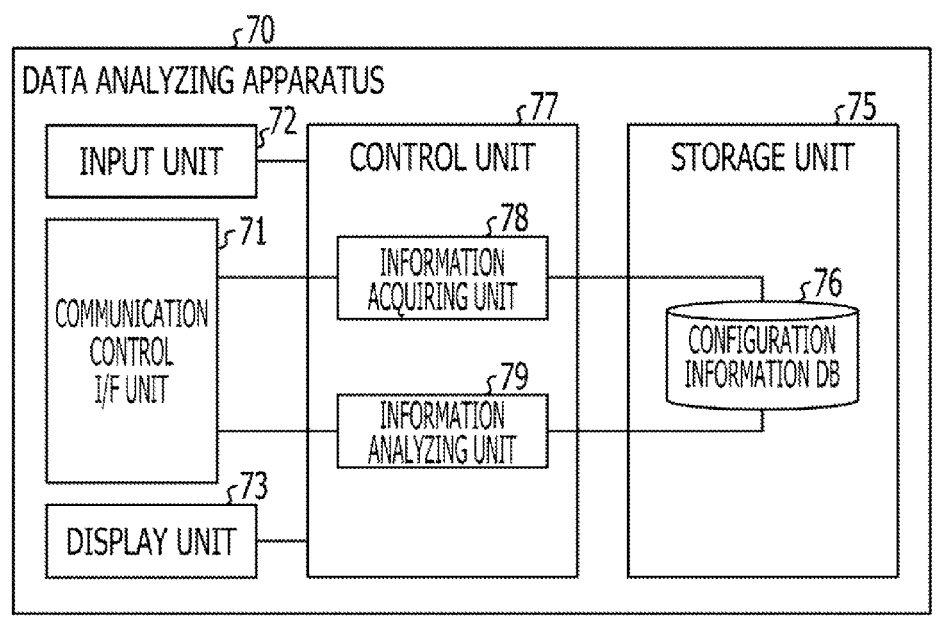
FIG. 17 is a block diagram illustrating an exemplary configuration of a data analyzing apparatus according to the second embodiment.

A data analyzing apparatus according to the second embodiment is described next with reference to FIG. 17. FIG. 17 is a block diagram illustrating an exemplary configuration of the data analyzing apparatus according to the second embodiment. As shown in FIG. 17, the data analyzing apparatus 70 includes a communication control I/F unit 71, an input unit 72, a display unit 73, a storage unit 75, and a control unit 77.

The communication control I/F unit 71 serves as an interface having at least one communication port. The communication control I/F unit 71 controls information communicated between the data analyzing apparatus and a different apparatus. For example, the communication control I/F unit 71 receives a configuration information data from a data management apparatus 50.

The input unit 72 includes, for example, a keyboard, a mouse, and a microphone. The input unit 72 receives, for example, an instruction to start or stop the system and start analysis. Thereafter, the input unit 72 inputs the information to the control unit 77 described below. Note that the display unit 73 described below realizes a pointing device function in cooperation with the mouse. The display unit 73 includes, for example, a monitor, a display, a touch panel, and a speaker. The display unit 73 displays, for example, the configuration information data stored in the storage unit 75 or the result of analysis.

The storage unit 75 stores data and programs required by the control unit 77 for performing a variety of processes. The storage unit 75 further stores a configuration information DB 76. A storage device, such as a hard disk, may be used as the storage unit 75. The configuration information DB 76 stores a configuration information data received from the data management apparatus 50 (refer to FIG. 3) in association with an application running on each of the servers. For example, by updating configuration information data collected by the data management apparatus 50, the configuration information DB 76 may store the latest configuration information data.

The control unit 77 may be formed from an electronic circuit, such as a central processing unit (CPU) or a micro processing unit (MPU). The control unit 77 includes an internal memory for storing control programs, such as an OS, a program defining the sequence of various processes, and required data. In addition, the control unit 77 includes an information acquiring unit 78 and an information analyzing unit 79. Thus, the control unit 77 performs a variety of processes.

Upon receiving, from the data management apparatus 50, a request for acquiring a configuration information data, the information acquiring unit 78 acquires, from the data management apparatus 50, the configuration information data identified by, for example, the CD-ID included in the request and stores the configuration information data in the configuration information DB 76. In this way, the information acquiring unit 78 may acquire and store a new configuration information data each time the new configuration information data is stored in the data management apparatus 50. Thus, the information acquiring unit 78 may maintain the latest information in the configuration information DB 76.

In addition, upon receiving a difference notification message from the data management apparatus 50, the information acquiring unit 78 acquires, from the data management apparatus 50, the configuration information data identified by, for example, the CI-ID included in the message and stores the acquired configuration information data in the configuration information DB 76. In this way, even when a new configuration information data is collected by the data management apparatus 50 during the analyzing apparatus 70 being in an incommunicable state, the information acquiring unit 78 may acquire the new configuration information data immediately after the data analyzing apparatus 70 enters a communicable state. Accordingly, the information acquiring unit 78 may keep the information data stored in the configuration information DB 76 to be the latest ones without delay.

After the information acquiring unit 78 acquires the configuration information data from the data management apparatus 50 and stores the configuration information data in the configuration information DB 76, the information acquiring unit 78 sends, to the information analyzing unit 79, a message indicating that a new configuration information data has been stored in the configuration information DB 76.

Upon receiving, from the information acquiring unit 78, the message indicating that a new configuration information data has been stored in the configuration information DB 76, the information analyzing unit 79 refers to the update date and time of the configuration information DB 76 and acquires the newly stored configuration information data. Thereafter, the information analyzing unit 79 performs data analysis on the acquired configuration information data and displays the result of analysis (e.g., information regarding an application and a process running on each of the servers and fault information) on a management console 80. Note that a widely used fault analysis method may be used as a method for analyzing the configuration information data.

[Process Performed by Data Management Apparatus]

An exemplary process performed by the data management apparatus according to the second embodiment is described next with reference to FIGS. 18 to 22. Hereinafter, the outline of the process performed by the data management apparatus according to the second embodiment is described first with reference to FIG. 18. Subsequently, the detailed process flow is described with reference to FIGS. 19 to 22.

(Outline of Process)

Figure 18:
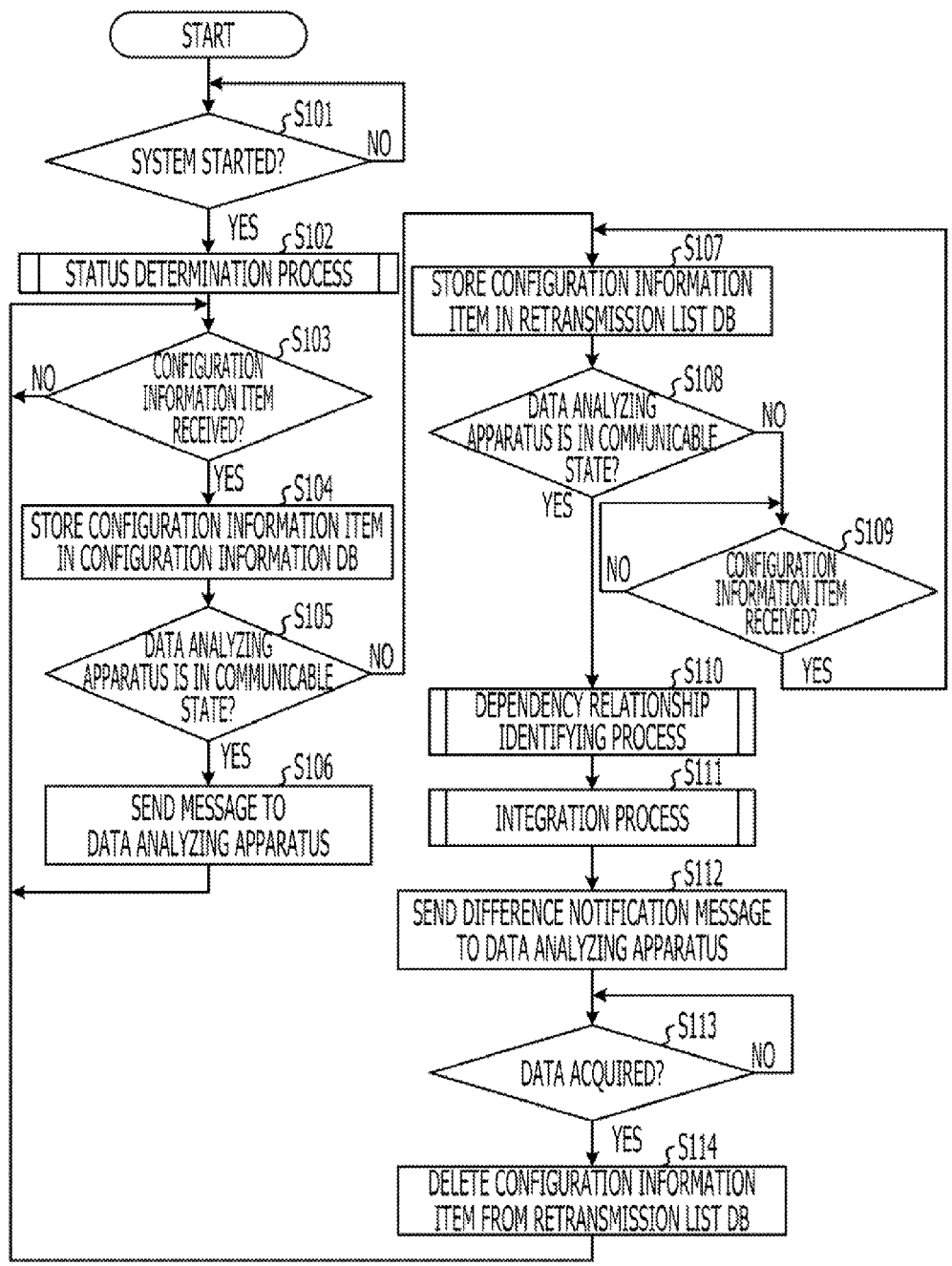
FIG. 18 is a flowchart illustrating schematic process flow performed by the data management apparatus according to the second embodiment.

The outline of the process performed by the data management apparatus according to the second embodiment is described first with reference to FIG. 18. FIG. 18 is a flowchart illustrating schematic process flow performed by the data management apparatus according to the second embodiment.

As shown in FIG. 18, if the system is started (Yes in S101), the data management apparatus 50 performs a status determination process (e.g., via the status determination unit 61 in FIG. 5) in which it is determined whether the configuration information data to be analyzed have a dynamic characteristic or a static characteristic (S102). The data management apparatus 50 subsequently may send the result of the status determination process to the data analyzing apparatus 70 (once it is determined that the data analyzing apparatus 70 is in a communicable state).

In this way, the data management apparatus 50 identifies dependency relationships among the configuration information data. Thereafter, upon receiving a configuration information data from the data collection apparatus 10 (Yes in S103), the data management apparatus 50 stores the received configuration information data in the configuration information DB 57 (S104).

Subsequently, the data management apparatus 50 determines whether the data analyzing apparatus 70 is in a communicable state (S105). If the data management apparatus 50 determines that the data analyzing apparatus 70 is in a communicable state (Yes in S105), the data management apparatus 50 sends, to the data analyzing apparatus 70, a message indicating that a new configuration information data has been stored in the configuration information DB 57 (S106).

However, if the data management apparatus 50 determines that the data analyzing apparatus 70 is in an incommunicable state (No in S105), the data management apparatus 50 stores the received configuration information data, that is, the configuration information data newly stored in the configuration information DB 57, in the retransmission list DB 58 (S107).

Subsequently, the data management apparatus 50 determines whether the data analyzing apparatus 70 is in a communicable state (S108). If the data management apparatus 50 determines that the data analyzing apparatus 70 is in an incommunicable state (No in S108), the data management apparatus 50 stores the subsequently received configuration information data in the configuration information DB 57 and the retransmission list DB 58 (S109).

However, if the data management apparatus 50 determines that the data analyzing apparatus 70 is in a communicable state (Yes in S108), the data management apparatus 50 performs a dependency relationship identifying process (e.g., via the relationship identifying unit 63) to identify dependency relationships among the configuration information data that are stored in the retransmission list DB 58 and that have a dynamic characteristic (S110).

Subsequently, the data management apparatus 50 performs an integration process on the configuration information data having dependency relationships identified in the dependency relationship identifying process (S111). After the data management apparatus 50 performs the integration process, the data management apparatus 50 sends a difference notification message to the data analyzing apparatus 70 (S112).

Subsequently, if the configuration information data stored in the retransmission list DB 58 is acquired by the data analyzing apparatus 70 (Yes in S113), the data management apparatus 50 deletes the configuration information data in the retransmission list DB 58 (S114). Thereafter, the processing returns to S103 and the subsequent processes are repeated.

(Flow of Status Determination Process)

Figure 19:
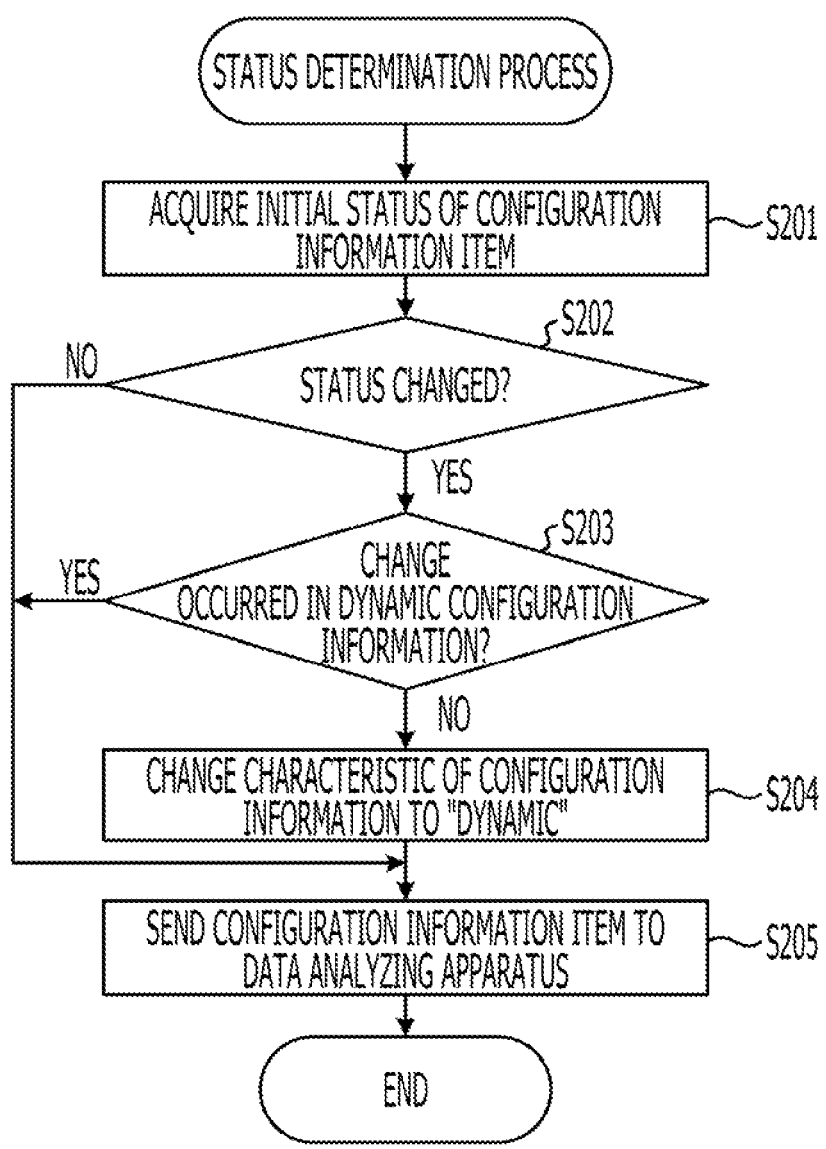
FIG. 19 is a flowchart of a status determination process performed by the data management apparatus.

An exemplary flow of the status determination process in the entire flow shown in FIG. 18 is schematically described with reference to FIG. 19. FIG. 19 is a flowchart of the status determination process performed by the data management apparatus. Note that FIG. 19 illustrates the process performed in S102 shown in FIG. 18 in more detail.

As shown in FIG. 19, after the system is started, the status determination unit 61 of the data management apparatus 50 acquires the configuration information data to be analyzed by the data analyzing apparatus 70, that is, the initial status of the configuration information data to be managed by the data management apparatus 50 (S201). At that time, in the initial status, the status determination unit 61 considers all of the configuration information data as static configuration information data.

Subsequently, after a predetermined period of time has elapsed, the status determination unit 61 determines whether a configuration information data that has been changed from its initial status is present (S202). If the characteristic of the configuration information data that has been changed is not dynamic, i.e., static, (No in S203), the status determination unit 61 changes the characteristic to a dynamic characteristic (S204) and transmits the configuration information data, including its changed characteristic, to the data analyzing apparatus 70 (S205).

However, if a configuration information data that has been changed from the initial status is present (No in S202) and the characteristic of the configuration information data that has been changed is dynamic (Yes in S203), the status determination unit 61 performs S205, not S204.

(Flow of Dependency Relationship Identifying Process)

Figure 20:
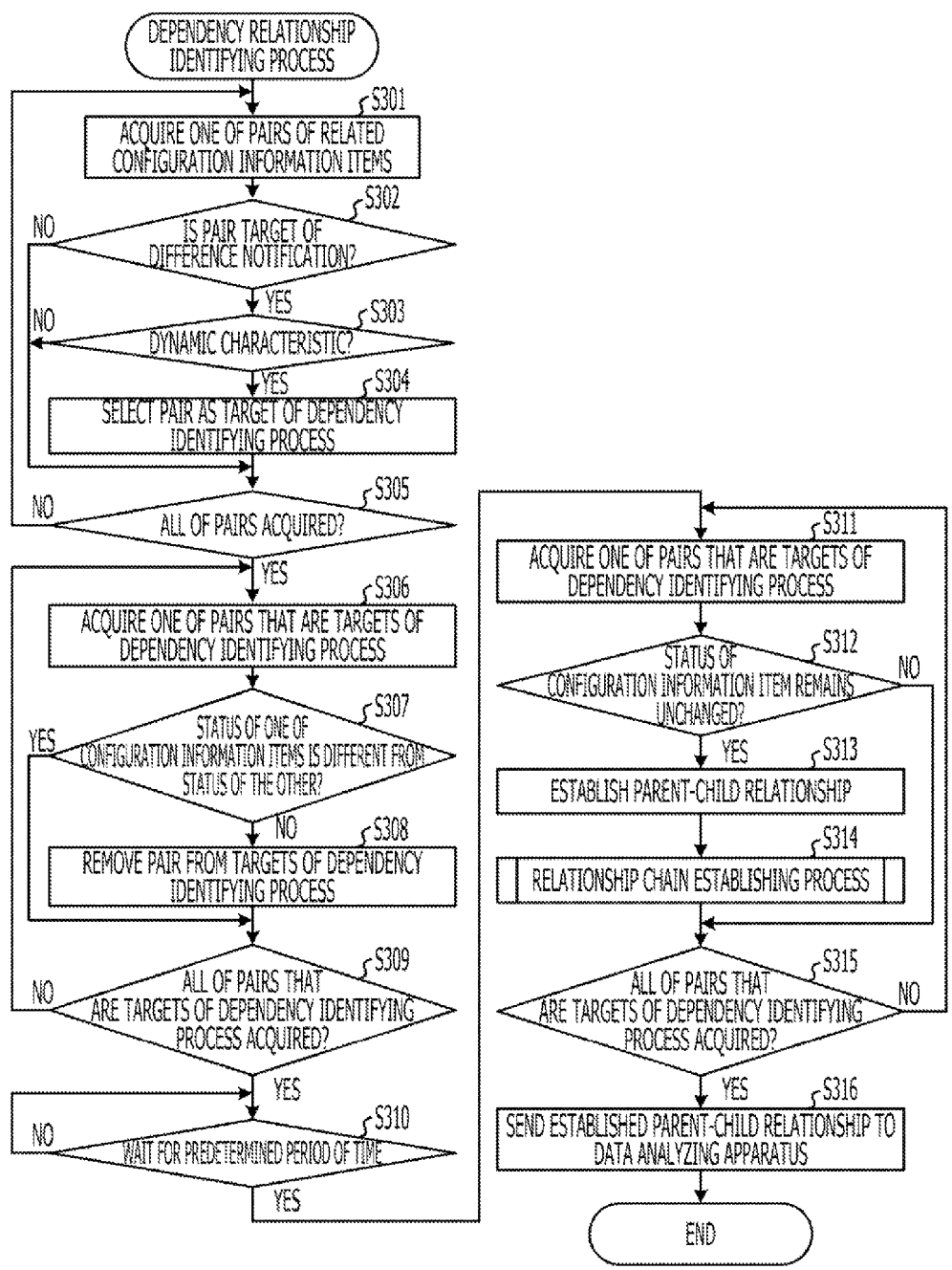
FIG. 20 is a flowchart of a dependency relationship identifying process performed by the data management apparatus.

The flow of the dependency relationship identifying process in the overall flow shown in FIG. 18 is described next with reference to FIG. 20. FIG. 20 is a flowchart of the dependency relationship identifying process performed by the data management apparatus. That is, FIG. 20 illustrates a process performed in step S110 shown in FIG. 18.

As shown in FIG. 20, the relationship identifying unit 62 of the data management apparatus 50 acquires one of the pairs of related configuration information data pre-selected by an administrator (S301). Thereafter, the relationship identifying unit 62 determines whether the acquired pair of configuration information data is a target of difference notification stored in the retransmission list DB 58 (S302). If the relationship identifying unit 62 determines that the acquired pair of the configuration information data is a target of difference notification (Yes in S302), the relationship identifying unit 62 determines whether the configuration information data has a dynamic characteristic using the information determined by the status determination unit 61 (S303).

In this way, if the pair of related configuration information data is a target of difference notification and has a dynamic characteristic (Yes in S303), the relationship identifying unit 62 selects such configuration information data as configuration information data to be subjected to a dependency determination process (S304). However, if the pair of related configuration information data is not a target of difference notification (No in S302) or if the pair has not a dynamic characteristic (No in S303), the relationship identifying unit 62 performs a process in S305.

Subsequently, the relationship identifying unit 62 performs the processes in S301 to S304 on each of the pairs of related configuration information data (S305). After the relationship identifying unit 62 completes the processes performed on all of the pairs of related configuration information data (Yes in S305), the relationship identifying unit 62 acquires one of the pairs of related configuration information data selected as a pair for which a dependency relationship is to be determined (S306).

Subsequently, if the statuses of the configuration information data in the acquired pair do not differ from each other (No in S307), the relationship identifying unit 62 deletes the pair so that the pair is not a target of dependency determination (S308). However, if the statuses of the configuration information data in the acquired pair differs from each other (Yes in S307), the relationship identifying unit 62 continues to consider the pair as the target of dependency determination and the process in S309 is performed.

The relationship identifying unit 62 performs the processes in S306 to S308 on each of the pairs of configuration information data selected as a target of dependency determination in S301 to S305 (S309).

Subsequently, if the relationship identifying unit 62 performs processing on all of the pairs of configuration information data (Yes in S309), the relationship identifying unit 62 enters a ready state and stays in that state for a predetermined period of time (S310). After the predetermined period of time has elapsed (Yes in S310), the relationship identifying unit 62 acquires one of the pairs of configuration information data to be subjected to dependency determination (S311). Thereafter, the relationship identifying unit 62 determines whether the status of the configuration information data has been changed (S312).

If the status of the configuration information data remains the same (Yes in S312), the relationship identifying unit 62 identifies a parent-child relationship in the pair (S313) and performs a relationship chain establishing process in order to identify a linkage of parent-child relationships (S314). However, if the status of the configuration information data has been changed (No in S312), the relationship identifying unit 62 performs a process in S315.

If the processes in S311 to S314 have not been performed on all of the pairs of the configuration information data to be subjected to dependency determination (No in S315), the processing performed by the relationship identifying unit 62 returns to S311. Thus, the subsequent processes are performed.

However, if the processes in S311 to S314 have been performed on all of the pairs of the configuration information data to be subjected to dependency determination (Yes in S315), the relationship identifying unit 62 stores the established parent-child relationship in the parent-child relationship DB 56 and sends a message indicating the established parent-child relationship to the data analyzing apparatus 70 (S316).

(Flow of Relationship Chain Establishing Process)

Figure 21:
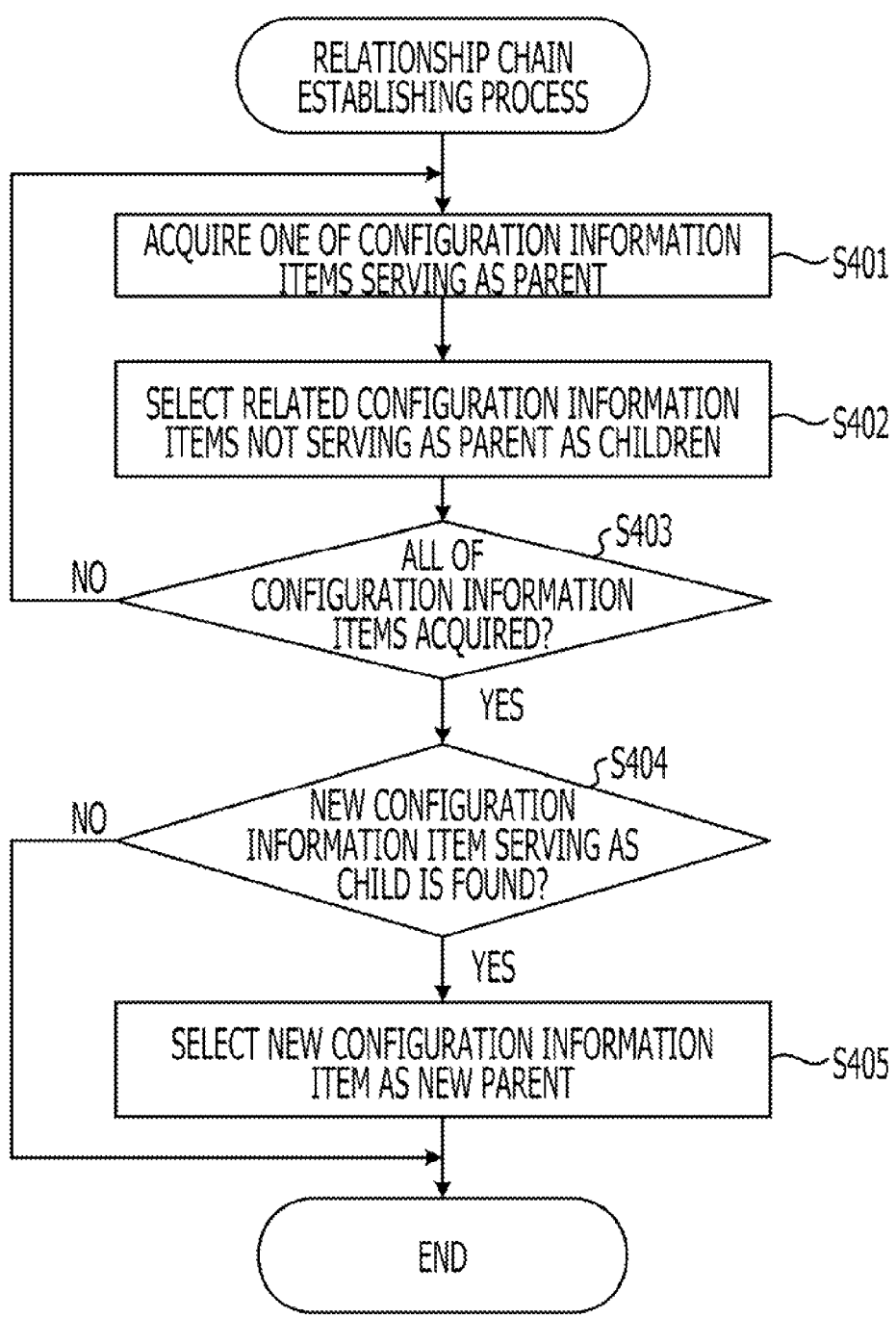
FIG. 21 is a flowchart of a relationship chain establishing process in the dependency relationship identifying process.

The flow of a relationship chain identifying process in the dependency relationship identifying process shown in FIG. 20 is described next with reference to FIG. 21. FIG. 21 is a flowchart of the relationship chain establishing process in the dependency relationship identifying process. That is, FIG. 21 illustrates the process performed in S314 shown in FIG. 20 in more detail.

As shown in FIG. 21, the relationship identifying unit 62 of the data management apparatus 50 acquires one of the configuration information data that were identified as parents in FIG. 20 (S401) and identifies, as a child, the configuration information data related to the identified configuration information data (S402). Thereafter, the relationship identifying unit 62 performs the processes in S401 and S402 on all of the configuration information data identified as parents (S403).

Subsequently, if the configuration information data that newly serves as a child is found (Yes in step S404), the relationship identifying unit 62 identifies a parent-child relationship in which the configuration information data newly serves as a parent. In this way, the relationship identifying unit 62 identifies a chain of parent-child relationships (step S405).

(Flow of Integrating Process)

Figure 22:
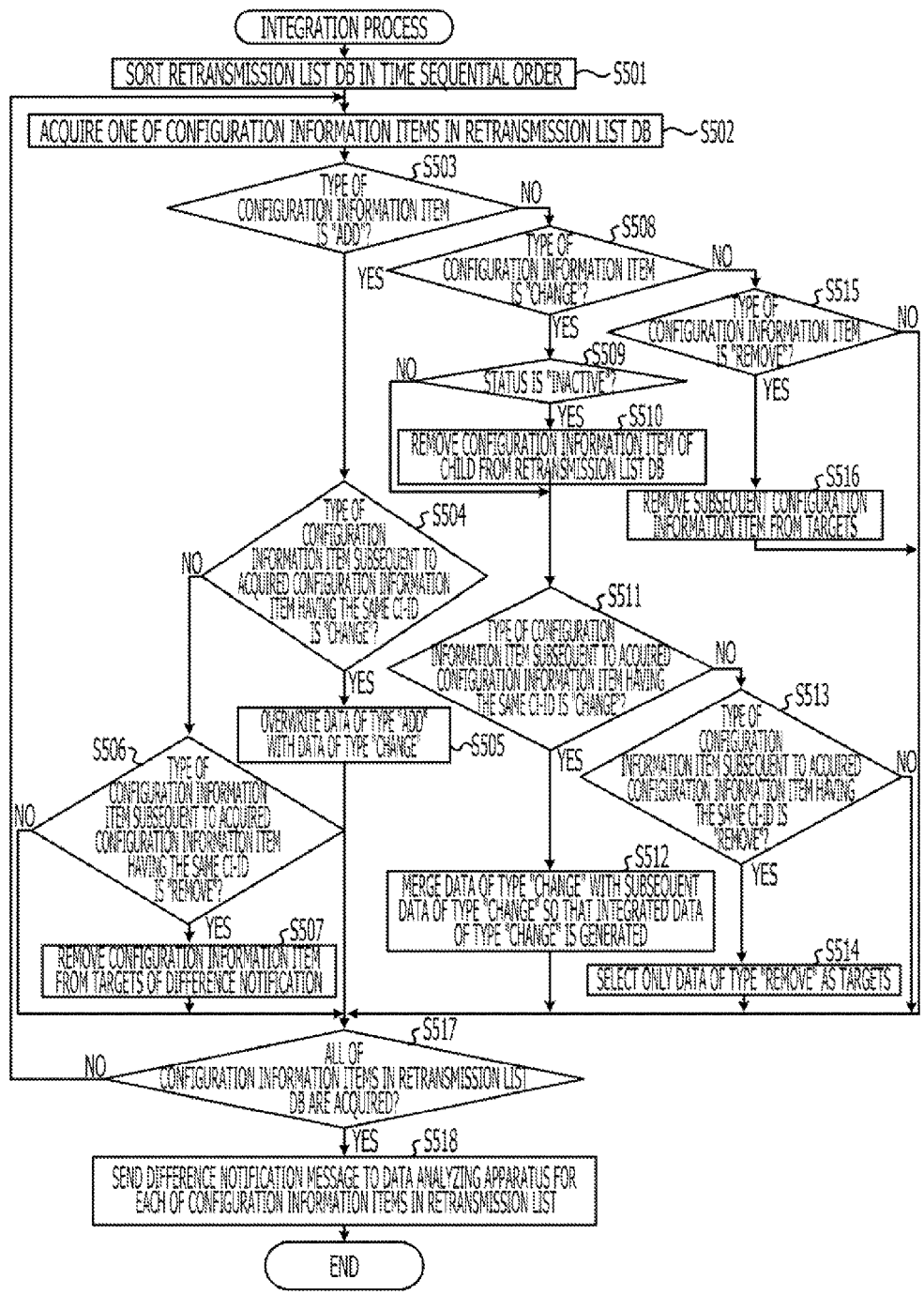
FIG. 22 is a flowchart of an integrating process performed by the data management apparatus.

The flow of the integrating process in the entire process shown in FIG. 18 is described with reference to FIG. 22. FIG. 22 is a flowchart of the integrating process performed by the data management apparatus. That is, FIG. 22 illustrates the process performed in S111 shown in FIG. 18 in more detail.

As shown in FIG. 22, after completing the status determination process, the second integrating unit 66 of the data management apparatus 50 rearranges the configuration information data stored in the retransmission list DB 58 in time sequential order (step S501). Thereafter, the second integrating unit 66 acquires one of the configuration information data stored in the retransmission list DB 58 in order from the earliest configuration information data (S502).

If the second integrating unit 66 determines that the type of the acquired configuration information data is "ADD" (Yes in S503), the second integrating unit 66 determines whether the type of the configuration information data stored subsequent to the acquired configuration information data and having a CI-ID that is the same as that of the acquired configuration information data is "CHANGE" (step S504).

Subsequently, if the second integrating unit 66 determines that the type of the configuration information data having the same CI-ID is "CHANGE" (Yes in step S504), the previously stored configuration information data having a type of "ADD" is overwritten with the subsequently stored configuration information data having a type of "CHANGE". The overwritten configuration information data has a type of "ADD". In this way, the configuration information data are integrated (S505).

However, if the second integrating unit 66 determines that the type of the configuration information data having the same CI-ID is not "CHANGE" (No in S504), the second integrating unit 66 determines whether the type of the subsequently stored configuration information data having the same CD-ID is "REMOVE" (S506).

If the second integrating unit 66 determines that the type of the configuration information data having the same CD-ID is "REMOVE" (Yes in S506), the second integrating unit 66 deletes the configuration information data having a type of "ADD" from the retransmission list DB 58. Thus, the configuration information data is not a target of difference notification (S507). However, if the second integrating unit 66 determines that the type of the configuration information data having the same CD-ID is not "REMOVE" (No in S506), the second integrating unit 66 continues to select the acquired configuration information data having a type of "ADD" as a target of difference notification.

When the processing returns to S503 and if the second integrating unit 66 determines that the type of the acquired configuration information data is not "ADD" (No in S503), the second integrating unit 66 determines whether the type of the acquired configuration information data is "CHANGE" (S508).

If the second integrating unit 66 determines that the type of the acquired configuration information data is "CHANGE" (Yes in S508), the first integrating unit 65 determines whether the status of the acquired configuration information data is "inactive" (step S509).

Subsequently, if the first integrating unit 65 determines that the status of the acquired configuration information data is "inactive" (Yes in S509), the first integrating unit 65 deletes the configuration information data that serves as a child of the acquired configuration information data from the retransmission list DB 58 (S510). However, if the first integrating unit 65 determines that the status of the acquired configuration information data is not "inactive" (No in S509), the first integrating unit 65 performs the process in S511.

Subsequently, the second integrating unit 66 determines whether the type of the configuration information data stored subsequent to the acquired configuration information data and having the same CI-ID is "CHANGE" (S511). If the second integrating unit 66 determines that the type of the configuration information data having the same CI-ID is "CHANGE" (Yes in S511), the second integrating unit 66 merges the subsequently stored configuration information data and having a type of "CHANGE" with the previously stored configuration information data and having a type of "CHANGE". The merged configuration information data has a type of "CHANGE". Thus, the second integrating unit 66 integrates the configuration information data (S512).

However, if the second integrating unit 66 determines that the type of the configuration information data having the same CI-ID is not "CHANGE" (No in S511), the second integrating unit 66 determines whether the type is "REMOVE" (S513). If the second integrating unit 66 determines that the type of the configuration information data having the same CI-ID is "REMOVE" (Yes in S513), the second integrating unit 66 deletes the previously stored configuration information data having a type of "CHANGE" from the retransmission list DB 58. Thereafter, the second integrating unit 66 selects the configuration information data having a type of "REMOVE" as a target of difference notification (S514). However, if the second integrating unit 66 determines that the type of the configuration information data having the same CI-ID is not "REMOVE" (No in S513), the second integrating unit 66 continues to select the previously stored configuration information data having a type of "CHANGE" as a target of difference notification.

Thereafter, the processing returns to S508. If the second integrating unit 66 determines that the type of the acquired configuration information data is not "CHANGE" (No in S508), the second integrating unit 66 determines whether the type of the acquired configuration information data is "REMOVE" (S515).

If the second integrating unit 66 determines that the type of the acquired configuration information data is "REMOVE" (Yes in S515), the second integrating unit 66 removes, from targets of difference notification, the configuration information data subsequently stored in the retransmission list DB 58 and having the same CI-ID (S516). However, if the second integrating unit 66 determines that the type of the acquired configuration information data is not "REMOVE" (No in S515), the second integrating unit 66 considers the configuration information data as a target of difference notification and performs the process in S517.

Subsequently, the second integrating unit 66 performs the above-described processes in S502 to S516 on all of the configuration information data stored in the retransmission list DB 58 (S517). After the second integrating unit 66 performs the processes on all of the configuration information data stored in the retransmission list DB 58 (Yes in S517), the second integrating unit 66 sends, to the data analyzing apparatus 70, a difference notification message indicating a request to acquire the configuration information data in the retransmission list DB 58 (S518).

As described above, according to the second embodiment, the data management apparatus 50 may efficiently send, to the data analyzing apparatus 70, a message indicating that a configuration information data is changed. In addition, if the data analyzing apparatus 70 is down and, therefore, a large number of difference notification messages remain in the data management apparatus 50, the resources used for storing the difference notification messages may be reduced, since the difference notification messages remaining in the data management apparatus 50 are integrated. Furthermore, when the data analyzing apparatus 70 is recovered, the difference information data remaining in the data management apparatus 50 may be sent to the data analyzing apparatus 70 at high speed.

While the present invention has been described with reference to exemplary embodiments, the present invention may be also realized by various forms of embodiments other than the exemplary embodiments. The other embodiments are described below.

(Process Flow)

For example, the sequence of the processes described in the second embodiment may be changed into any sequence. Alternatively, the processes may be performed independently. For example, the process performed by the first integrating unit 65 and the process performed by the second integrating unit 66 may be performed in any order. Any one of the processes may be performed first. Alternatively, only one of the processes may be performed. Still alternatively, the first integrating unit 65 may be integrated into the second integrating unit 66, and the processes may be performed at substantially the same time. In addition, either one of S110 and S111 shown in FIG. 18 may be performed first.

(System)

Among the processes described in the present embodiment, all or some of the processes that are performed automatically may be performed manually. Alternatively, all or some of the processes that are performed manually may be performed automatically using a widely used method. In addition, the processing procedure, the control procedure, and the names of the components (e.g., the information including various data and parameters shown in FIGS. 3 and 4 and FIGS. 6 to 16) may be freely changed if not otherwise specified.

The components of each of the apparatuses illustrated in the drawings are functionally conceptual. Accordingly, the physical configurations are not necessarily the same as the configurations shown in the drawings. That is, for example, the first integrating unit 65 may be integrated into the second integrating unit 66. Thus, the way of distributing and integrating the apparatuses is not limited to that shown in the drawings. All or some of the apparatuses may be functionally or physically distributed or integrated in accordance with the processing load of each of the apparatuses and the use environment. Furthermore, all or some of the functions of each of the apparatus are realized by a CPU and an analysis program executed by the CPU or hardware formed from wired logic.

(Program)

The various processes illustrated in the above-described embodiments may be realized by executing prestored programs using a computer system, such as a personal computer or a workstation. Accordingly, an exemplary computer system that executes programs for providing the above-described functions is described below.

Figure 23:
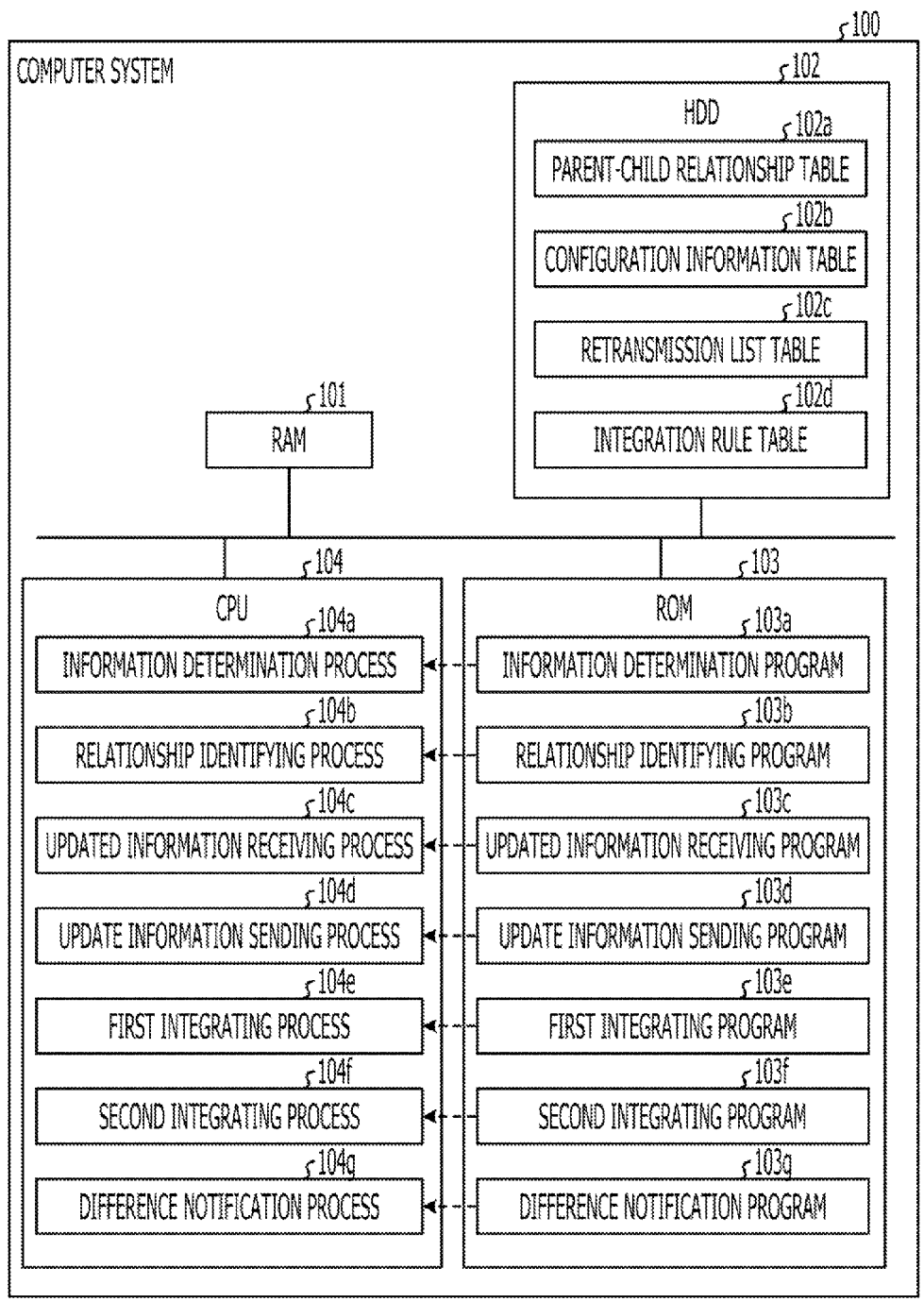
FIG. 23 illustrates a computer system that executes a data management program.
Figure 24:
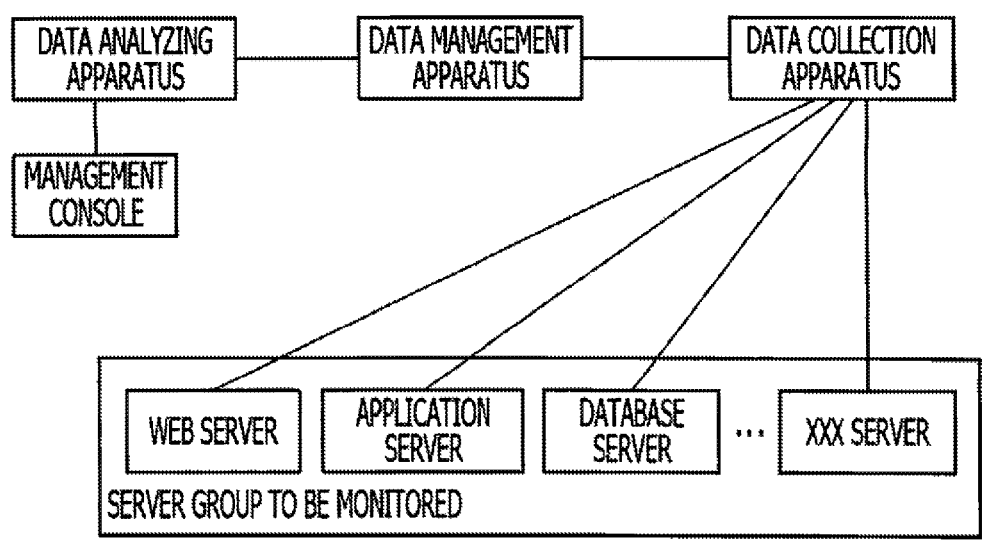
FIG. 24 illustrates an existing related technology.

FIG. 23 illustrates a computer system 100 that executes a data management program. As shown in FIG. 23, the computer system 100 includes a random access memory (RAM) 101, a hard disk drive (HDD) 102, a read only memory (ROM) 103, and a CPU 104. Programs for providing the above-described functions are prestored in the ROM 103. That is, as shown in FIG. 23, an information determination program 103a, a relationship identifying program 103b, an updated information receiving program 103c, an update information sending program 103d, and a first integrating program 103e are prestored. In addition, a second integrating program 103f and a difference notification program 103g are prestored in the ROM 103.

When the CPU 104 reads the programs 103a to 103g and executes the programs 103a to 103g, a variety of processes are generated, as shown in FIG. 23. That is, an information determination process 104a, a relationship identifying process 104b, an updated information receiving process 104c, an update information sending process 104d, a first integrating process 104e, a second integrating process 104f, and a difference notification process 104g are generated. Note that the information determination process 104a corresponds to the status determination unit 61 shown in FIG. 5. Similarly, the relationship identifying process 104b corresponds to the relationship identifying unit 62. The updated information receiving process 104c corresponds to the updated information receiving unit 63. The update information sending process 104d corresponds to the updated information notification unit 64. The first integrating process 104e corresponds to the first integrating unit 65. The second integrating process 104f corresponds to the second integrating unit 66. The difference notification process 104g corresponds to the difference notification unit 67.

The HDD 102 includes a parent-child relationship table 102a, a configuration information table 102b, a retransmission list table 102c, and an integration rule table 102d. The parent-child relationship table 102a corresponds to the parent-child relationship DB 56 shown in FIG. 5. The configuration information table 102b corresponds to the configuration information DB 57. In addition, the retransmission list table 102c corresponds to the retransmission list DB 58. The integration rule table 102d corresponds to the integration rule DB 59.

Note that the programs 103a to 103g are not necessarily recorded in the ROM 103. For example, the programs 103a to 103g may be stored in a recording medium, such as a flexible disk (FD), a compact disc-read only memory (CD-ROM), a digital versatile disc (DVD), a magnetooptical disk, or an IC card, which is to be mounted in the computer system 100. Alternatively, the programs 103a to 103g may be stored in a recording medium (e.g., an HDD) disposed inside or outside the computer system 100. Still alternatively, the programs 103a to 103g may be stored in a recording medium disposed in a different computer system connected to the computer system 100 via a public line, the Internet, a local area network (LAN), or a wide area network (WAN). In such a case, the computer system 100 may read the programs from the recording medium disposed in the different computer system.

That is, the programs according to the present embodiment are recorded in the above-described recording medium so as to be computer-readable. By reading such programs from the recording medium and executing the programs, the computer system 100 provides the above-described functions. Note that, according to the present embodiment, the programs are not limited to those executed by the computer system 100. For example, the present invention is applicable even when a different computer system or a server executes the programs or even when a different computer system and a server together cooperatively execute the programs.

According to the above-described form of the data management apparatus and the data management program, a delay of the data analyzing process performed by the data analyzing apparatus may be prevented or at least reduced even when a large number of configuration information data to be analyzed remain unprocessed.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

The invention claimed is:

1. A data management apparatus comprising:
an analyzing apparatus determination unit configured to determine whether a data analyzing apparatus is in a communicable state for communication with the data management apparatus when configuration information data indicating a status of a server apparatus is received from a data collection apparatus;
an unprocessed information storage unit configured to store a plurality of configuration information data, including the received configuration information data, once it is determined that data analyzing apparatus is in an incommunicable state;
an information integrating unit configured to integrate the plurality of configuration information data stored in the unprocessed information storage unit in accordance with a predetermined condition;
a stored information notifying unit configured to send, to the data analyzing apparatus, a message indicating that the data management apparatus is storing the plurality of configuration information data integrated by the information integrating unit once it is determined that the data analyzing apparatus is in a communicable state;
a status determination unit configured to determine whether the configuration information data as received from the data collection apparatus is dynamic information data that changes the status of the received configuration information data; and
a relationship identifying unit configured to identify a dependency relationship between two configuration information data that are determined as dynamic information data by the status determination unit from among the plurality of configuration information data stored in the unprocessed information storage unit;
the information integrating unit integrates the plurality of configuration information data stored in the unprocessed information storage unit in accordance with the dependency relationship between the two configuration information data as determined by the relationship identifying unit and a change in the status of the determined two configuration information data.

2. The data management apparatus according to claim 1, further comprising:
an integration rule storage unit configured to store an integration rule used for integrating the plurality of configuration information data; and
the information integrating unit integrates the plurality of configuration information data stored in the unprocessed information storage unit in accordance with the integration rule stored in the integration rule storage unit.

3. A non-transitory computer-readable recording medium storing a data processing program, which when executed by a computer, causes the computer to perform a method, the method comprising:
determining whether a data analyzing apparatus is in a communicable state for communication thereto when configuration information data indicating a status of a server apparatus is received;
storing a plurality of configuration information data, including the received configuration information data, when it is determined that the data analyzing apparatus is in an incommunicable state;
integrating the stored plurality of configuration information data in accordance with a predetermined condition;
sending, to the data analyzing apparatus, a message indicating the storing of the integrated plurality of configuration information data when the data analyzing apparatus enters a communicable state;
determining whether the configuration information data as received is dynamic information data that changes a status of the received configuration information data;
identifying a dependency relationship between two configuration information data that are determined as dynamic information data from among the stored plurality of configuration information data; and
the integrating includes integrating the stored plurality of configuration information data in accordance with the dependency relationship between the two determined configuration information data and a change in the status of the determined two configuration information data.

4. The computer-readable recording medium according to claim 3, the integrating comprising:
integrating the stored plurality of configuration information data in accordance with a stored integration rule that is a part of the predetermined condition.

5. A method of managing a plurality of data servers, comprising:
receiving configuration information data indicating a status of one of the plurality of data servers;
first determining whether the received configuration information data is dynamic information data that changes a status of the received configuration information data;
second determining whether a data analyzing apparatus is in a communicable state for communication thereto;
storing a plurality of configuration information data indicating statuses of the one data server, including the received configuration information data, when it is determined that the data analyzing apparatus is in an uncommunicable status;
identifying a dependency relationship between two configuration information data that are determined as dynamic information data from among the stored plurality of configuration information data; and
integrating the stored plurality of configuration information data in accordance with the dependency relationship between the two determined configuration information data and a change in the status of the determined two configuration information data; and
sending, to the data analyzing apparatus, a message indicating the storing of the integrated plurality of configuration information data when the data analyzing apparatus enters a communicable state.

6. The method of managing the plurality of data servers according to claim 5, with the first determining comprising:
determining, after a predetermined period of time, whether the received configuration information data is dynamic information data that changes an initial status of the received configuration information data;
upon determining that the received configuration information data is changed from the initial status based on the dynamic information data, determining whether the received configuration information data has a static characteristic; and
upon determining that the received configuration information data has a static characteristic, changing the static characteristic to a dynamic characteristic for the received configuration information data; and
sending the received configuration information data, including the dynamic characteristic thereof, to the data analyzing apparatus.

7. The method of managing the plurality of data servers according to claim 6, with the first determining further comprising:
upon determining that the received configuration information data has a dynamic characteristic, retaining the dynamic characteristic for the received configuration information data for the sending to the data analyzing apparatus.

* * * * *